(12) United States Patent (10) Patent No.: US 7,257,206 B2
Janveja et al. (45) Date of Patent: Aug. 14, 2007

(54) SKIP TRACING SYSTEM

(75) Inventors: Karn Janveja, Secunderabad (IN); Ray Yashwant Nath, New Delhi (IN)

(73) Assignee: General Electric Capital Corporation, Stamford, CT (US)

( * ) Notice: Subject to any disclaimer, the term of this patent is extended or adjusted under 35 U.S.C. 154(b) by 953 days.

(21) Appl. No.: 10/172,067

(22) Filed: Jun. 14, 2002

(65) Prior Publication Data

US 2003/0231750 A1 Dec. 18, 2003

(51) Int. Cl.
*H04M 15/00* (2006.01)
*G06Q 40/00* (2006.01)

(52) U.S. Cl. .............................. 379/114.03; 379/114.14; 705/38

(58) Field of Classification Search .................... 705/1, 705/7, 35, 38, 500; 707/1, 3, 4, 100, 104.1, 707/500; 379/114.14, 127.02, 32.01, 32.05, 379/114.03, 213.01
See application file for complete search history.

(56) References Cited

U.S. PATENT DOCUMENTS

| | | | |
|---|---|---|---|
| 6,798,413 B1 * | 9/2004 | Tracey et al. ................ | 345/440 |
| 6,993,491 B2 * | 1/2006 | Sansone ......................... | 705/1 |
| 2001/0011245 A1 * | 8/2001 | Duhon ........................... | 705/38 |
| 2003/0074308 A1 * | 4/2003 | Lawton et al. ................ | 705/38 |
| 2003/0187826 A1 * | 10/2003 | Kennedy et al. .............. | 707/1 |
| 2004/0017909 A1 * | 1/2004 | Rice .......................... | 379/266.07 |

OTHER PUBLICATIONS

"Skip Tracing: the art of finding people", download from http://222.inet-investigation.com/skip-tracing/skip-tracing.htm on May 31, 2002. © 2002 iNet Investigation. 1pg.

(Continued)

*Primary Examiner*—Quoc Tran
(74) *Attorney, Agent, or Firm*—Buckley, Maschoff & Talwalkar LLC

(57) ABSTRACT

A system for performing skip tracing provides a first user interface including an area for presenting at least one telephone number associated with account information of a customer retrieved from a mainframe computer system, a documentation area for inputting skip tracing results, a user interface control for indicating that a telephone number presented in the area is bad, wherein selection of the user interface control causes the documentation area to be populated with data indicating that the telephone number is bad, a second user interface control for indicating that a second telephone number presented in the area is good, wherein selection of the second user interface control causes the documentation area to be populated with data indicating that the second telephone number is good, and a third user interface control for causing data populating the documentation area to be recorded in a skip tracing data structure of the mainframe computer system and for causing display of a fourth user interface control, the fourth user interface control for causing the second telephone number to be recorded in a skip queue of the mainframe computer system.

14 Claims, 35 Drawing Sheets

/— 700

| INDIVIDUAL ID 701 | NAME 702 | ADDRESS 703 | S.S. # 704 | TELEPHONE NOS. 705 |
|---|---|---|---|---|
| 123 | MINNIE MOUSE | 101 MAIN ST. ANAHEIM, CA | 111-11-1111 | 213-945-8201 213-842-8310 213-877-4401 |
| 125 | DONALD DUCK | 345 ELM ST. STAMFORD, CT | 222-22-2222 | 310-778-9823 |
| 1400 | BUGS BUNNY | 777 OAK LN. NEW YORK, NY | 333-33-3333 | 212-555-1234 203-663-4987 917-798-0762 |
| 1402 | MICKEY MOUSE | 101 MAIN ST. ANAHEIM, CA | 444-44-4444 | 213-842-8310 213-842-8311 |

OTHER PUBLICATIONS

"People Locating—People Locating Tips—Skip Tracing", download from http://www.people-locating.com/find-em/people-search-tips.html on May 31, 2002. © 2001 All Rights Reserved for Rds Co. 2pgs.

NetDetective 7.0, "Instant Unlimited Searches", download from http://www.affiliates.jeanharris.com/cgi-bin/clickthru.cgi?sid=spyaccess&pid=ND on May 31, 2002. © 1996-2002 Harris Digital Publishing Group. 2pgs.

"Attachmate Solutions for IBM Mainframes", download from http://www.attachmate.com/products/platform/0,1315,6_1,00.html on May 2, 2002. © 2002 Attachmate Corporation. 2pgs.

"PC Connection: Attachmate, EXTRA! 6.5 for Windows 98/NT Migration", download from http://www.pcconnection.com/scripts/productdetail.asp?product_id=105957 on May 2, 2002. © 2002 PC Connection, Inc.

* cited by examiner

| ACCT. NO 401 | CUST. ID 402 | NAME 403 | ADDRESS 404 | S.S. NO 405 | BALANCE 406 | MINIMUM DUE 407 | DUE DATE 408 | TELEPHONE NOS. 409 |
|---|---|---|---|---|---|---|---|---|
| A103 | C13 | MINNIE MOUSE | 101 MAIN ST. ANAHEIM, CA | 111-11-1111 | $537.42 | $25.00 | 7/4/02 | H2139458201 B2138428310 |
| A272 | C15 | DONALD DUCK | 345 ELM ST. STAMFORD, CT | 222-22-2222 | 0.00 | --- | --- | H3107789823 |
| A275 | C302 | BUGS BUNNY | 777 OAK LN NEW YORK, NY | 333-33-3333 | $3499.43 | $212.00 | 6/30/02 | H2125551234 B2036634987 S9177980762 |
| A268 | C401 | MICKEY MOUSE | 101 MAIN ST. ANAHEIM, CA | 444-44-4444 | $15.00 | --- | --- | B2138428310 H2138428311 |

| ACCOUNT NO. 501 | SKIP DATE 502 | SKIP RESULT 503 |
|---|---|---|
| A103 | 9/10/02 | 0324 XTUT H2139458201 NA B2138428310 MR 8008712054 MR 0326 XQNT MD 2038774401 NA 2138428311 NA 3039451818 MD |
| A272 | 10/7/02 | XTUT H3107789823GD# |
| A275 | 8/6/02 | 0323 XQNT SR H2125551234 NA |

| ACCOUNT NO. 601 | PHONE NUMBER 602 |
|---|---|
| A103 | O3302951313 |
| A272 | H3107789823 |
| A234 | S2129059255 |

| INDIVIDUAL ID 701 | NAME 702 | ADDRESS 703 | S.S. # 704 | TELEPHONE NOS. 705 |
|---|---|---|---|---|
| 123 | MINNIE MOUSE | 101 MAIN ST. ANAHEIM, CA | 111-11-1111 | 213-945-8201<br>213-842-8310<br>213-877-4401 |
| 125 | DONALD DUCK | 345 ELM ST. STAMFORD, CT | 222-22-2222 | 310-778-9823 |
| 1400 | BUGS BUNNY | 777 OAK LN. NEW YORK, NY | 333-33-3333 | 212-555-1234<br>203-663-4987<br>917-798-0762 |
| 1402 | MICKEY MOUSE | 101 MAIN ST. ANAHEIM, CA | 444-44-4444 | 213-842-8310<br>213-842-8311 |

MAINFRAME EMULATOR

3/24/01 12:17:12

Account No.: A103

Minnie Mouse  Balance: $537.42
101 Main Street  Minimum Due: 25.00
Anaheim, CA  Due Date: 7/4/02
111-11-1111

Home: (213) 945-8201
Business: (213) 842-8310

1100

METRONET EMULATOR

12:10:43  METRONET ON-LINE INFORMATION SYSTEM  3/24/01

OPTION:

SELECTION:

NAME:  FIRST NAME (Y/N):  STREET NAME (Y/N):
HOUSE#  STREET:  SSN:
CITY:  ST.  ZIP:  PHONE #

SKIP TRACING APPLICATION

| File | Region | Screens | Accounts | Statistics |

SKIP TRACING APPLICATION - Step 2

File    Region    Screens    Accounts    Statistics

REGION 1

Account No.: A103

Minnie Mouse
101 Main Street
Anaheim, CA

SSN: 111-11-1111

H2139458201
H2138428310
Date: 0324 JCP H2139458201
Date: 0324 JCP H2138428310
Date: 0324 Skip Completed: XQNT
Date: 0324 Skip Completed: XQNT
Tel. # 800-871-2054
Tel. # 800-871-2054

NEXT STEP    OBAD    OPOSSIBLE
             ▶      GOOD

0324 XTUT H2139458201 NA
B2138428310 MR

Documentation 1500
1510
1520

SKIP TRACING APPLICATION - Step 2

File   Region   Screens   Accounts   Statistics

REGION 1

Account No.: A103

Minnie Mouse
101 Main Street
Anaheim, CA

SSN: 111-11-1111

| |
|---|
| H2139458201 |
| H2138428310 |
| Date: 0324 JCP H2139458201 |
| Date: 0324 JCP H2138428310 |
| Date: 0324 Skip Completed: XQNT |
| Date: 0324 Skip Completed: XQNT |
| Tel. # 800-871-2054 |
| Tel. # 800-871-2054 |

NEXT STEP   ○ BAD   ● POSSIBLE

[ B ▶ ]   [ GOOD ]

0324 XTUT H2139458201 NA
B2138428310 MR 8008712054
MR

— 1520

[ Documentation ]

FIG. 17

SKIP TRACING APPLICATION - Step 5 — 2400

| File | Region | Screens | Accounts | Statistics |

REGION 1

Account No.: A103

Minnie Mouse
101 Main Street
Anaheim, CA

SSN: 111-11-1111

THIS WAS  ○ BAD  ○ POSSIBLE
▶ GOOD

2410 —
0324 XTUT H2139458201 NA
B2138428310 MR 8008712054 MR
0326 XQNT MD 2038774401 NA
2138428311 NA

2420 — CCC
2430 — TRW
2440 — CBI

Documentation

SKIP TRACING SYSTEM

BACKGROUND

1. Field

The present invention relates to systems for skip tracing. More specifically, the present invention concerns, in some aspects, systems for determining telephone numbers associated with a delinquent customer account.

2. Discussion

Skip tracing generally refers to the processes used to track a debtor. For example, in a typical account database, 12 to 15% of delinquent accounts are not associated with a usable phone number. Accordingly, skip tracing includes processes for obtaining a phone number that is usable to resolve the delinquencies of a particular account. As a result, skip tracing may reduce write-off costs associated with delinquent accounts.

In some current skip tracing systems, a skip tracer uses a mainframe emulator to connect to a mainframe computer system. The skip tracer accesses an emulator screen of the mainframe that provides account information and attempts to locate a telephone number therefrom. Any located numbers are called, and results of the calls are recorded in the mainframe through a different mainframe emulator screen. The skip tracer repeats the above process with respect to multiple information screens of the mainframe and of other mainframe computer systems until a good number is found or until no more relevant information is available.

The foregoing systems present multiple inefficiencies. For example, the skip tracer is required to switch back and forth between many emulator screens. Also, the skip tracer may forget to access a mainframe screen that contains relevant information, or may overlook relevant information presented by an accessed screen. Furthermore, the skip tracer may identify and call a telephone number that has already been called, or may fail to call an identified number because of a mistaken belief that the number has already been called. Each of these inefficiencies increases the probability of error and the time required to perform appropriate skip tracing. Consequently, these inefficiencies increase both skip tracing costs and write-off costs resulting from inadequate skip tracing.

In view of the foregoing, what is needed is a system that may provide faster, more efficient and/or more accurate skip tracing of telephone numbers than provided by current systems.

BRIEF DESCRIPTION

In order to address the foregoing, embodiments of the present invention concern a system, a method, an apparatus, a computer-readable medium storing processor-executable process steps, and means to provide a first user interface including an area for presenting at least one telephone number associated with account information of a customer retrieved from a mainframe computer system, a documentation area for inputting skip tracing results, a user interface control for indicating that a telephone number presented in the area is bad, wherein selection of the user interface control causes the documentation area to be populated with data indicating that the telephone number is bad, a second user interface control for indicating that a second telephone number presented in the area is good, wherein selection of the second user interface control causes the documentation area to be populated with data indicating that the second telephone number is good, and a third user interface control for causing data populating the documentation area to be recorded in a skip tracing data structure of the mainframe computer system and for causing display of a fourth user interface control, the fourth user interface control for causing the second telephone number to be recorded in a skip queue of the mainframe computer system.

In some aspects, the present invention relates to retrieval of account information associated with one or more customers from a mainframe computer system, presentation of account information associated with one of the one or more customers, the account information including at least one telephone number associated with the one customer, presentation of a user interface including a user interface control for indicating that a telephone number is bad, detection of a user selection of the user interface control, the selection indicating that the at least one telephone number is bad, and population of a documentation area of the user interface with the indication that the telephone number is bad.

In still other aspects, some embodiments of the present invention include retrieval of account information associated with one or more customers from a mainframe computer system, presentation of account information associated with one of the one or more customers, the account information including at least one telephone number associated with the one customer, presentation of a user interface including a user interface control for indicating that a telephone number is good, detection of a user selection of the user interface control, the selection indicating that the at least one telephone number is good, recordation of an indication that the telephone number is good in a skip tracing data structure of the mainframe computer system, and recordation of the telephone number in a skip queue stored by the mainframe computer system.

A technical content of some embodiments of the invention is the integration of mainframe data retrieval with intuitive interfaces to efficiently perform and document skip tracing. With this and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 4 is a representative view of a tabular portion of a Region 1 database according to some embodiments of the present invention.

FIG. 5 is a representative view of a tabular portion of a skip tracing documentation database according to some embodiments of the present invention.

FIG. 6 is a representative view of a tabular portion of a skip queue according to some embodiments of the present invention.

FIG. 7 is a representative view of a tabular portion of a customer information database according to some embodiments of the present invention.

FIG. 11 is a representative view of an interface according to some embodiments of the present invention.

FIG. 15 is a representative view of an interface according to some embodiments of the present invention.

FIG. 17 is a representative view of an interface according to some embodiments of the present invention.

FIG. 24 is a representative view of an interface according to some embodiments of the present invention.

FIG. 28 is a representative view of an interface according to some embodiments of the present invention.

DETAILED DESCRIPTION

System Architecture

Figure 1:
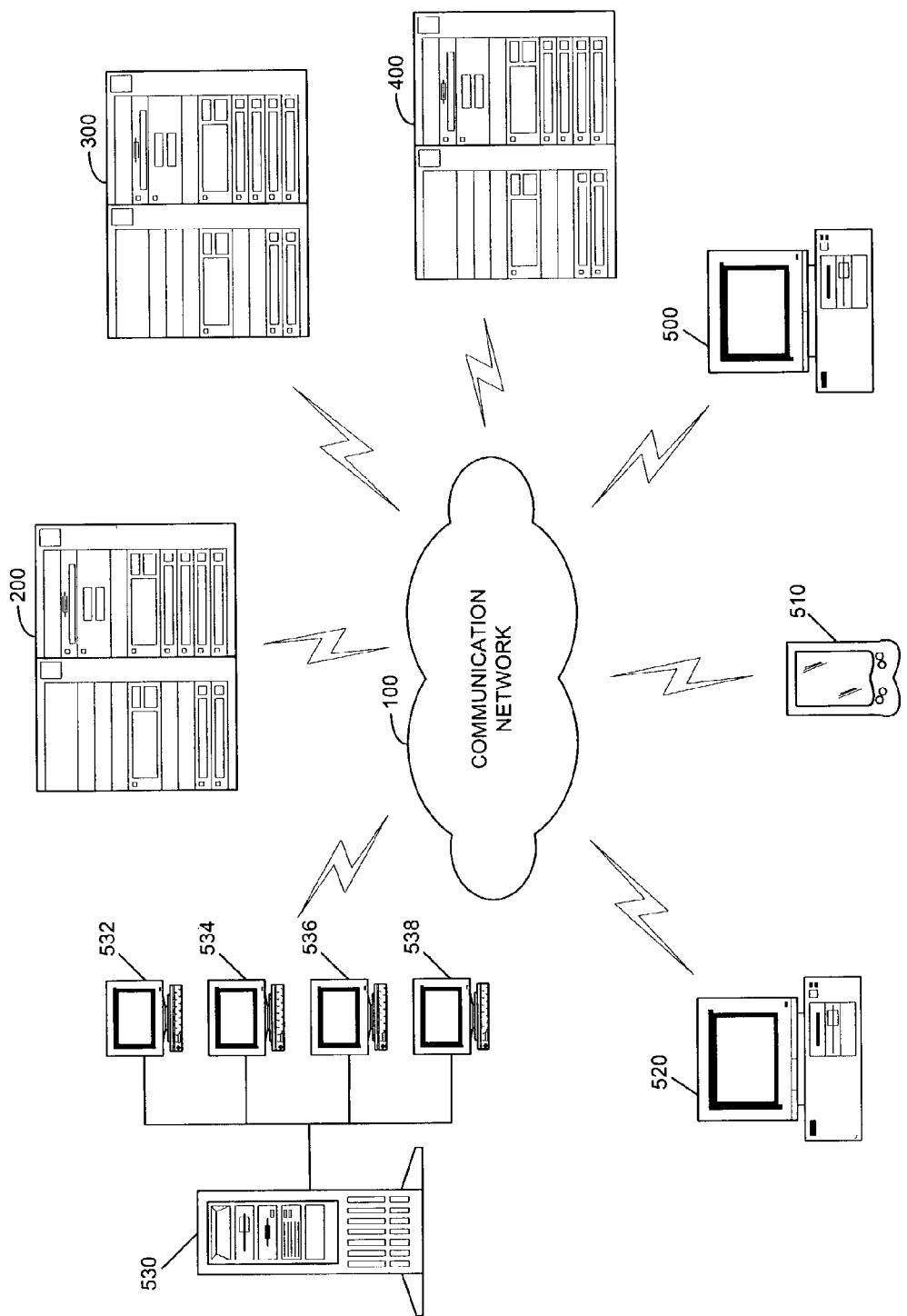
FIG. 1 is a topographic view of a network architecture according to some embodiments of the present invention.

FIG. 1 illustrates a network architecture of a system according to some embodiments of the present invention. As shown, communication network 100 provides communication between customer account device 200, customer information device 300, credit bureau device 400 and user devices 500 through 530. Of course, the invention may also be embodied using other architectures.

Communication network 100 may comprise any number of different systems for transferring data, including a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11b standard), a Bluetooth network, an Infrared Radiation (IR) network, and/or an IP network such as the Internet, an intranet or an extranet. As used herein, the term "communication" can refer to wired and/or wireless communication as appropriate.

Customer account device 200 may comprise a mainframe computer system such as an IBM S/390™ mainframe server. In some embodiments, customer account device 200 is operated by a credit and/or lending institution and stores information associated with credit and/or loan accounts managed by the institution. Customer account device 200 may also store information associated with accounts managed by two or more of such institutions. As will be described in detail below, customer account device 200 may provide information used to perform skip tracing according to some embodiments of the present invention. Customer account device 200 may also provide other services to its operating entity, including accounting, lending, collection, and file storage functions.

Customer information device 300 is a mainframe computer system operated by an entity providing information services. In some embodiments, customer information device 300 is operated by Metronet™, an entity that compiles address and demographic information and allows mainframe-friendly searching of the information in exchange for payment. One or more customer information devices such as device 300 may be used in conjunction with some embodiments of the present invention. These customer information devices may be operated by one or more entities.

Credit bureau device 400 is also depicted as a mainframe computer system and is operated by a credit bureau such as TRW™ or the like. As described below, information stored in device 400 is accessed to identify possible telephone numbers associated with customers. Again, one or more credit bureau devices such as device 400 may be used in conjunction with some embodiments of the present invention.

User devices 500, 510 and 520 comprise a personal computer, a personal digital assistant, and a personal computer, respectively, while user device 530 comprises a network server that serves data and applications to network terminals such as user devices 532 through 536. User devices 500 through 530 are capable of communicating with devices 200 through 400 over communication network 100, and of presenting an interface to a user in operation thereof. A user according to some embodiments of the present invention is an employee of an entity operating customer account device 200. Of course, user devices 500 through 530 may provide their respective users with functionality unrelated to the present invention.

In some embodiments, the devices of FIG. 1 are connected differently than as shown. For example, some or all of the devices may be connected directly to one another. Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Customer Account Device

Figure 2:
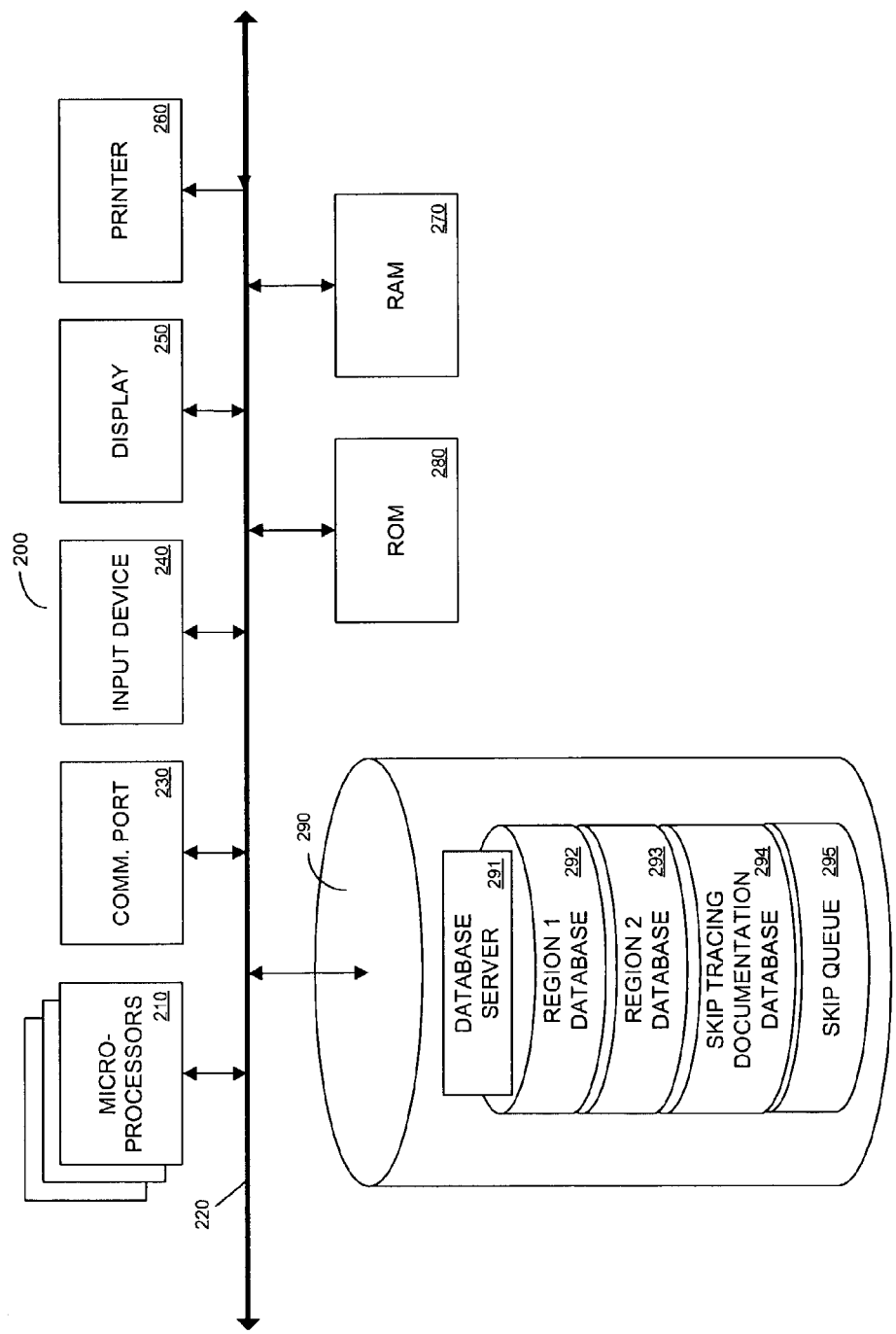
FIG. 2 is a block diagram of an internal architecture of a customer account device according to some embodiments to the present invention.

FIG. 2 is a block diagram of an internal architecture of customer account device 200 according to some embodiments of the invention. As illustrated, customer account device 200 includes microprocessors 210 in communication with communication bus 220. Microprocessors 210 may comprise RISC-based and other types of processors and are used to execute processor-executable process steps so as to control the elements of customer account device 200 to provide desired functionality.

Also in communication with communication bus 220 is communication port 230. Communication port 230 is used to transmit data to and to receive data from devices external to customer account device 200 such as user devices 500 through 530. Communication port 230 is therefore preferably configured with hardware suitable to physically interface with desired external devices and/or network connections. For example, communication port 230 may comprise an Ethernet connection to a local area network through which customer account device 200 may receive and transmit information over the Web.

Input device 240, display 250 and printer 260 are also in communication with communication bus 220. Any known input device may comprise input device 240, including a keyboard, mouse, touch pad, voice-recognition system, and any combination of these devices. Of course, information may also be input to customer account device 200 from other devices via communication port 230.

Display 250 may be an integral or separate CRT display, flat-panel display or the like used to display graphics and text in response to commands issued by microprocessors 210. Printer 260 may also present text and graphics to an operator, but in hardcopy form using ink-jet, thermal, dot-matrix, laser, or other printing technologies.

RAM 265 is connected to communication bus 220 to provide microprocessors 210 with fast data storage and retrieval. In this regard, processor-executable process steps being executed by microprocessors 210 are typically stored temporarily in RAM 270 and executed therefrom by microprocessors 210. ROM 280, in contrast, provides storage from which data can be retrieved but to which data cannot be stored. Accordingly, ROM 280 is used to store invariant process steps and other data, such as basic input/output instructions and data used during boot-up of customer account device 200 or to control communication port 230. It should be noted that one or both of RAM 270 and ROM 280 may communicate directly with microprocessors 210 instead of over communication bus 220.

Data storage device 290 stores, among other data, processor-executable process steps of database server 291. Microprocessors 210 execute the process steps of database server 291 in order to control customer account device 200 to provide requested information from the databases stored therein. In this regard, data storage device 290 also stores region 1 database 292, region 2 database 293, skip tracing documentation database 294 and skip queue 295.

Region 1 database 292 and region 2 database 293 store account information for customer accounts associated with fictional region 1 and region 2, respectively. Each region may represent a geographic region, a particular chain of stores, a particular store, a particular lending entity, or another type of region. Customer account device 200 may store customer accounts associated with more than two regions, and customer accounts associated with several regions may be stored in a single data structure. As will be described with respect to FIGS. 8A through 8H, the stored customer account information may be used to identify accounts to be subjected to skip tracing, as well as to identify usable telephone numbers for the identified accounts.

Skip tracing documentation database 294 records skip tracing activities associated with customer accounts. The recorded activities are taken into account when performing subsequent skip tracing of the accounts. Skip queue 295 stores a queue of customer accounts and associated telephone numbers. Accordingly, skip queue 295 may specify customer accounts to be collected and associated telephone numbers to a collections department.

Also stored in data storage device 290 may be other unshown elements that may be necessary for operation of customer account device 200. These elements may include an operating system, a backup application, other applications, other data files, and "device drivers" for allowing microprocessors 210 to interface with devices in communication with communication port 230. These elements are known to those skilled in the art, and are therefore not described in detail herein.

User Device

Figure 3:
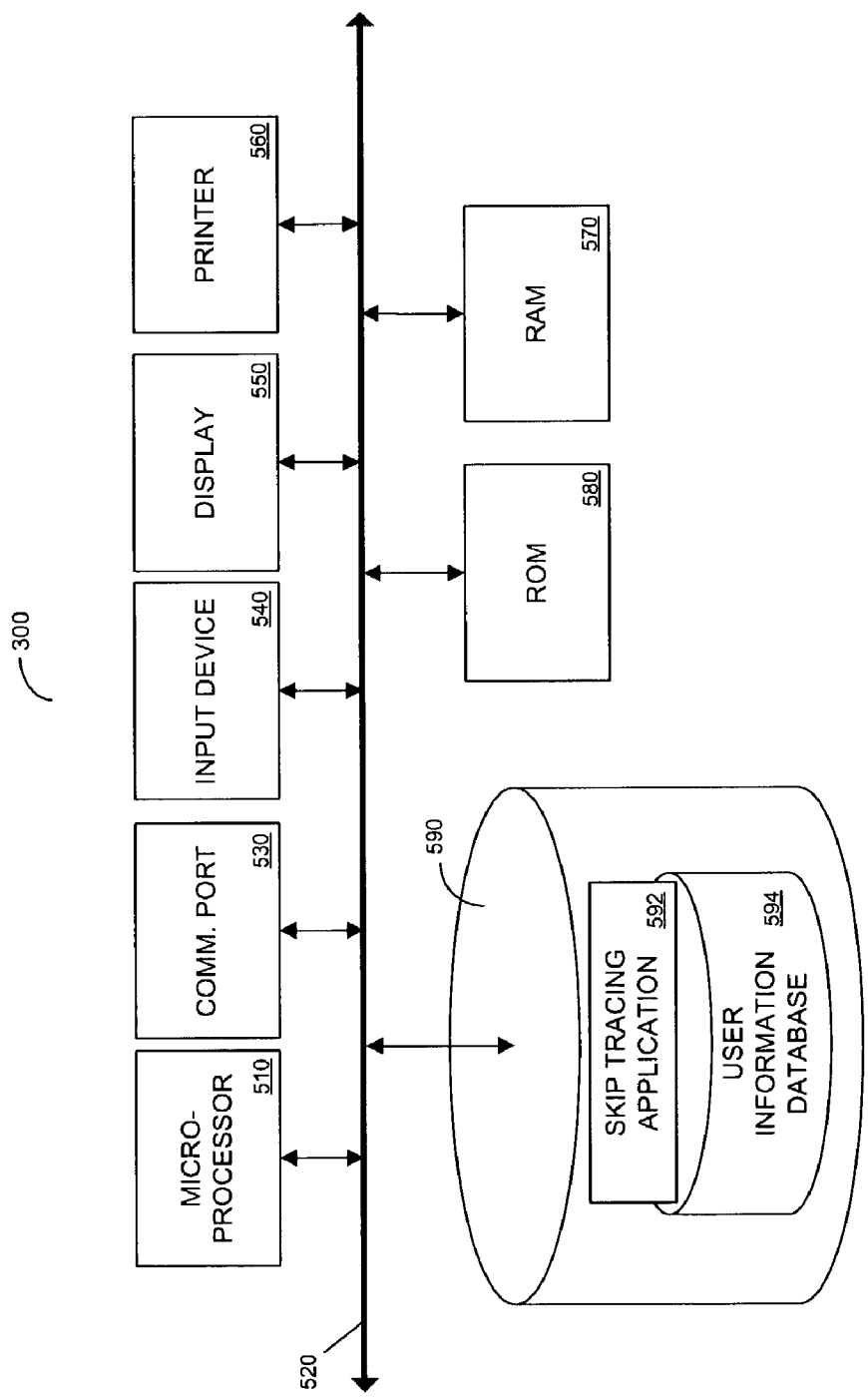
FIG. 3 is a block diagram of an internal architecture of a user device according to some embodiments to the present invention.
Figure 8A:
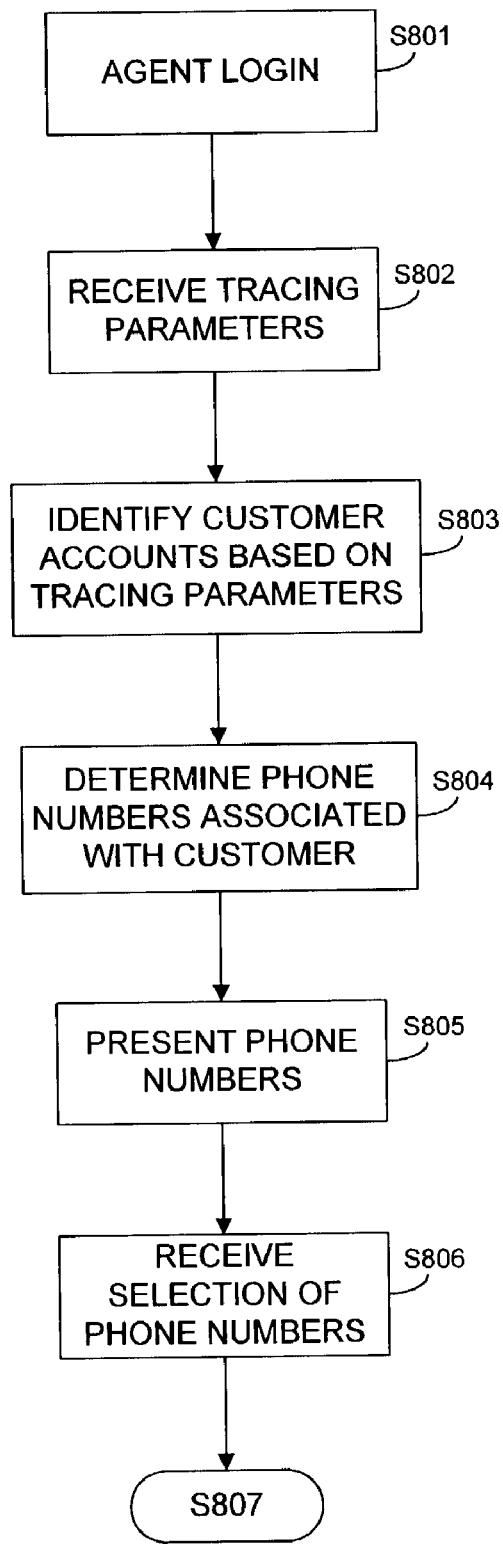
FIGS. 8A through 8H comprise a flow diagram of process steps according to some embodiments of the present invention.
Figure 8B:
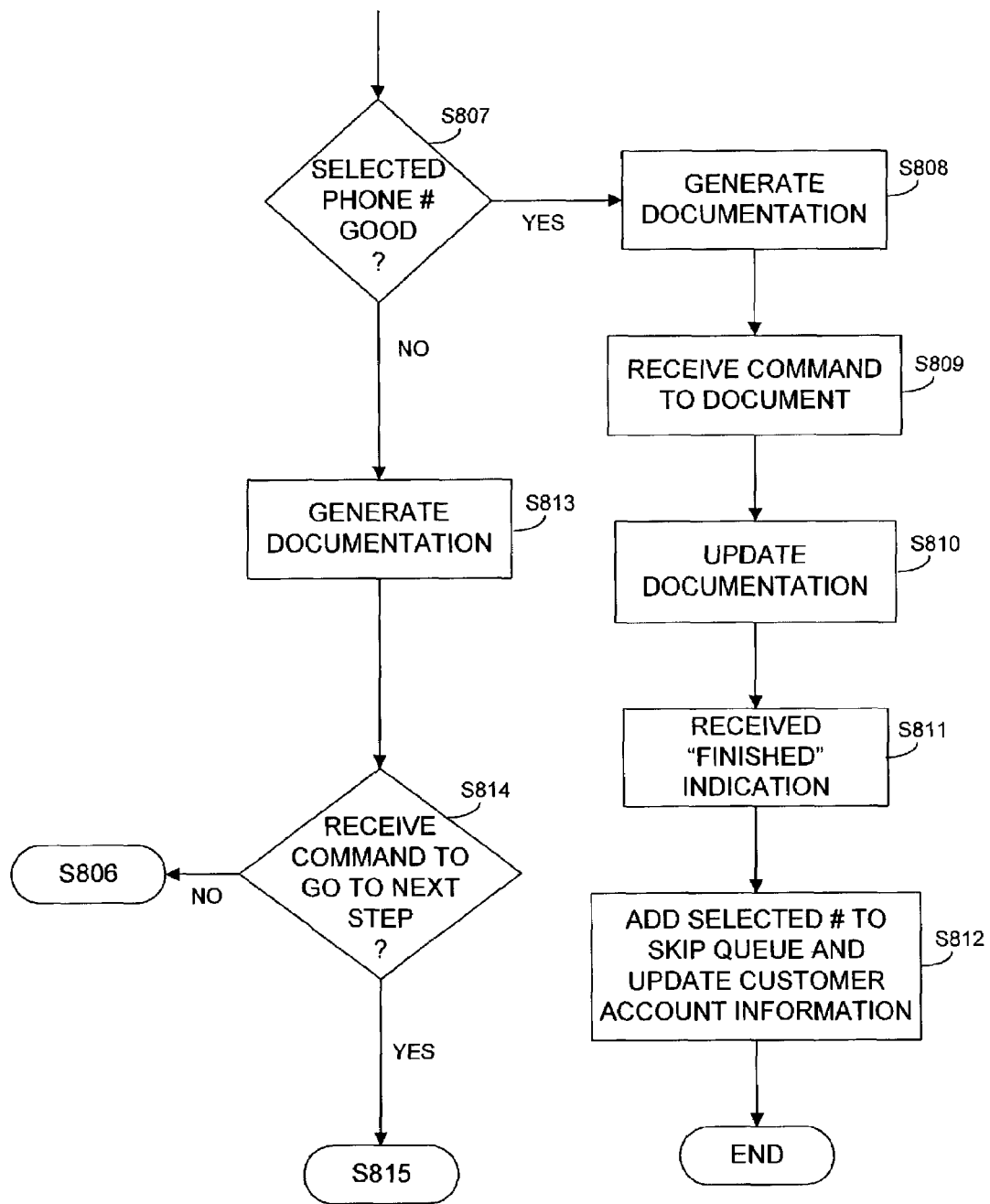
Figure 8C:
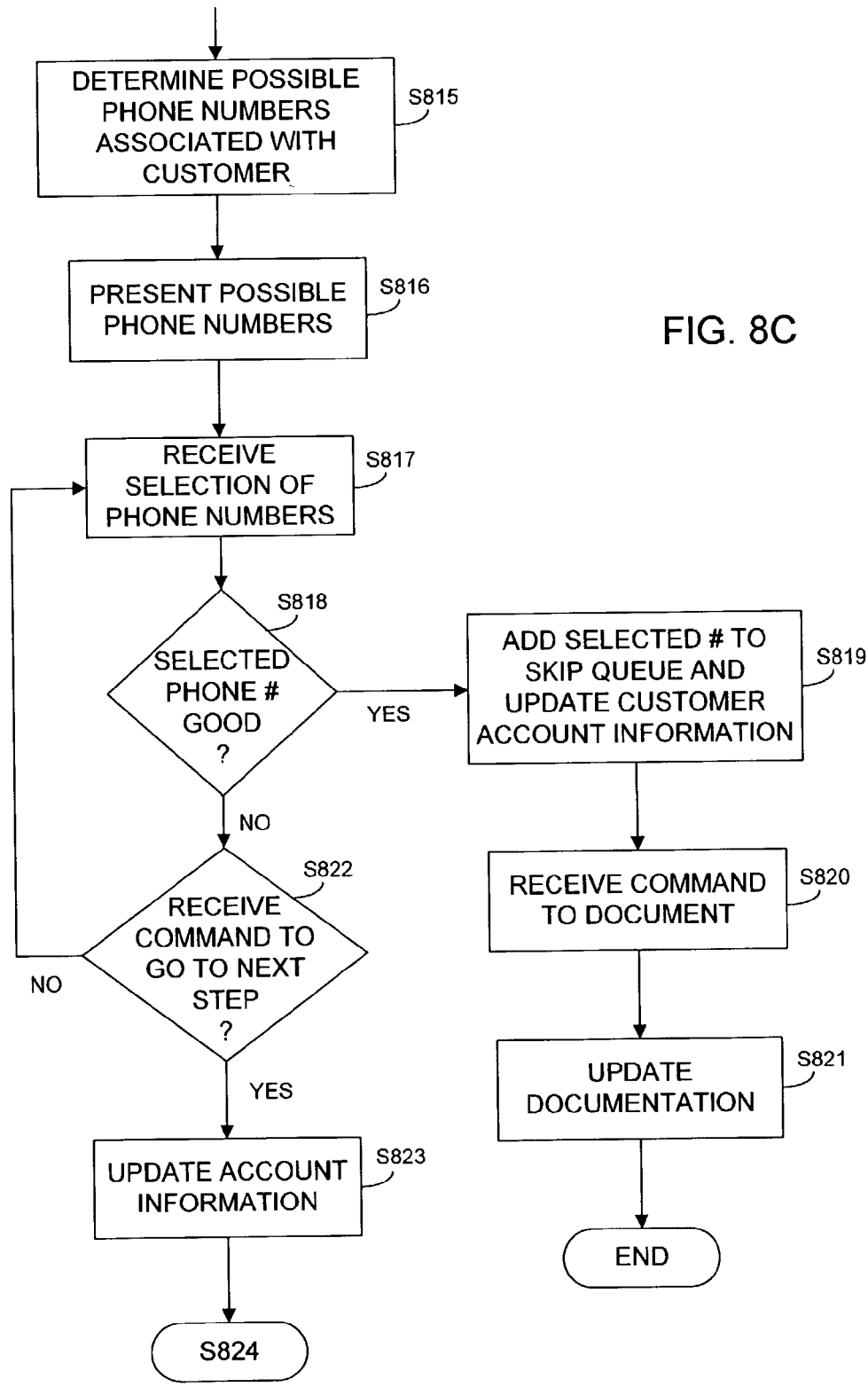
Figure 8D:
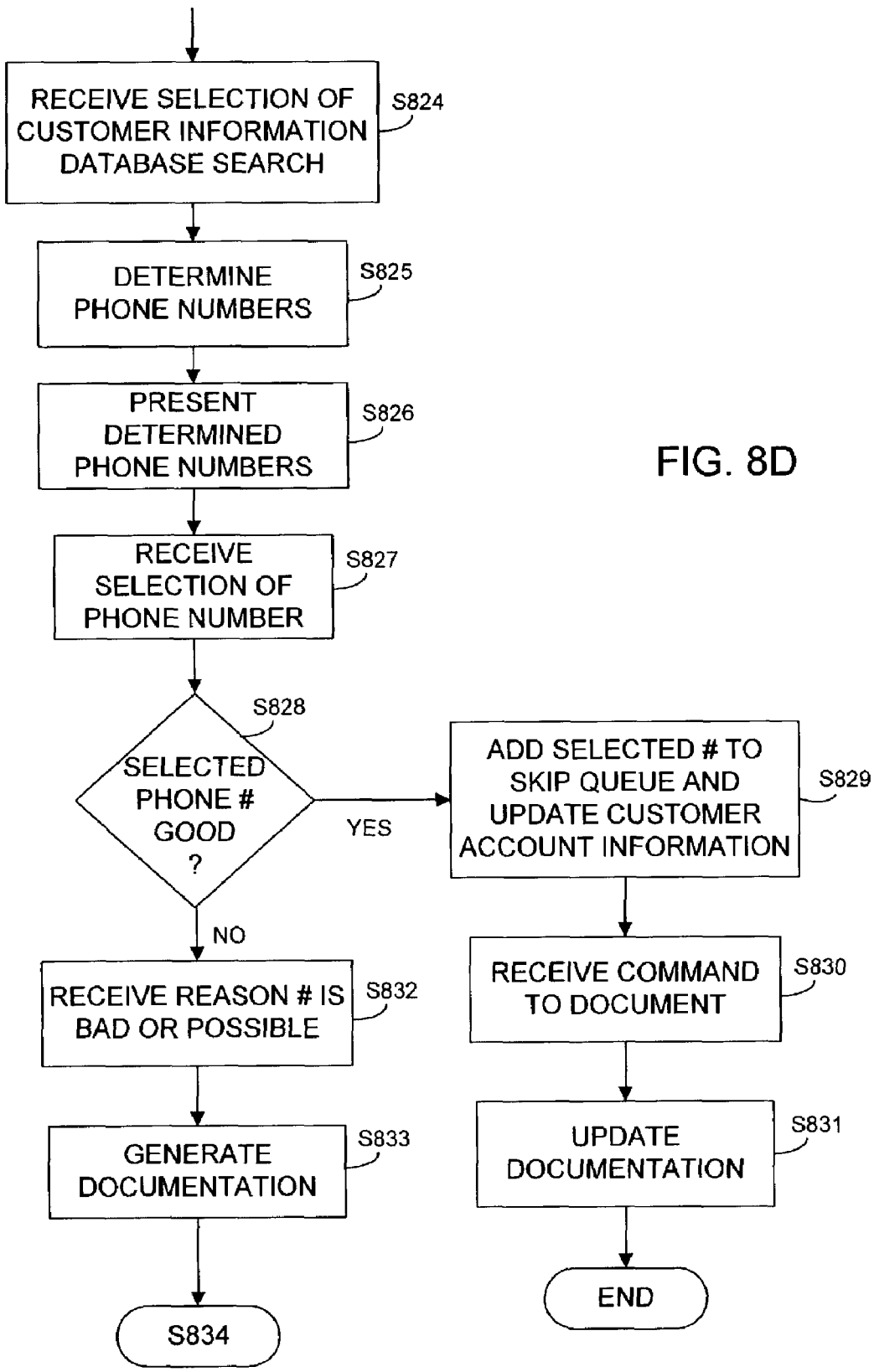
Figure 8E:
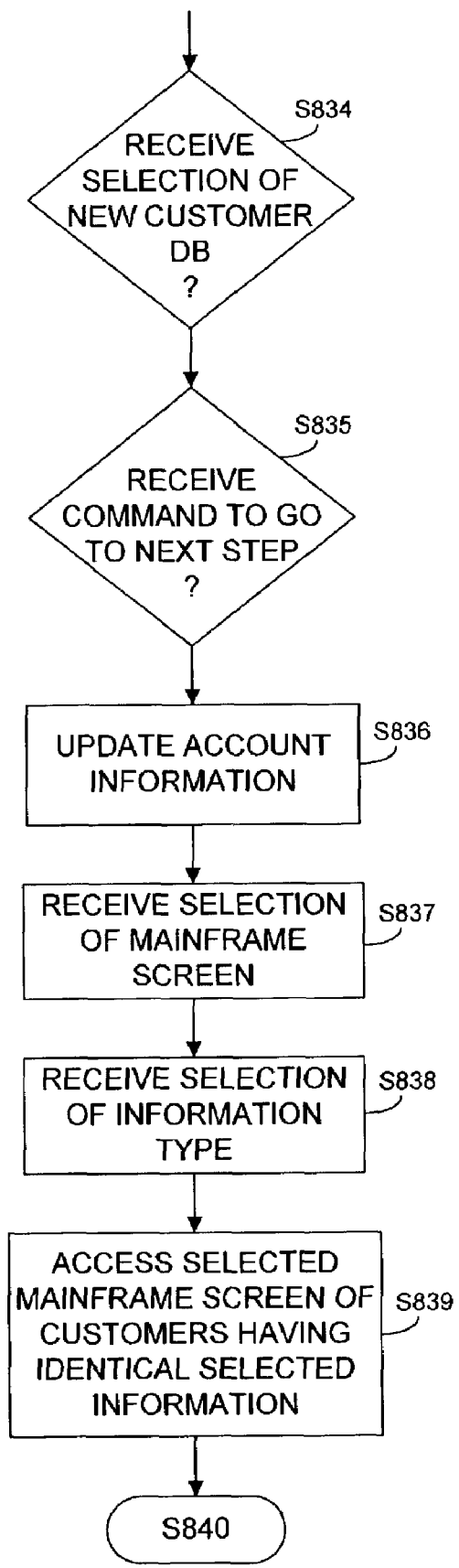
Figure 8F:
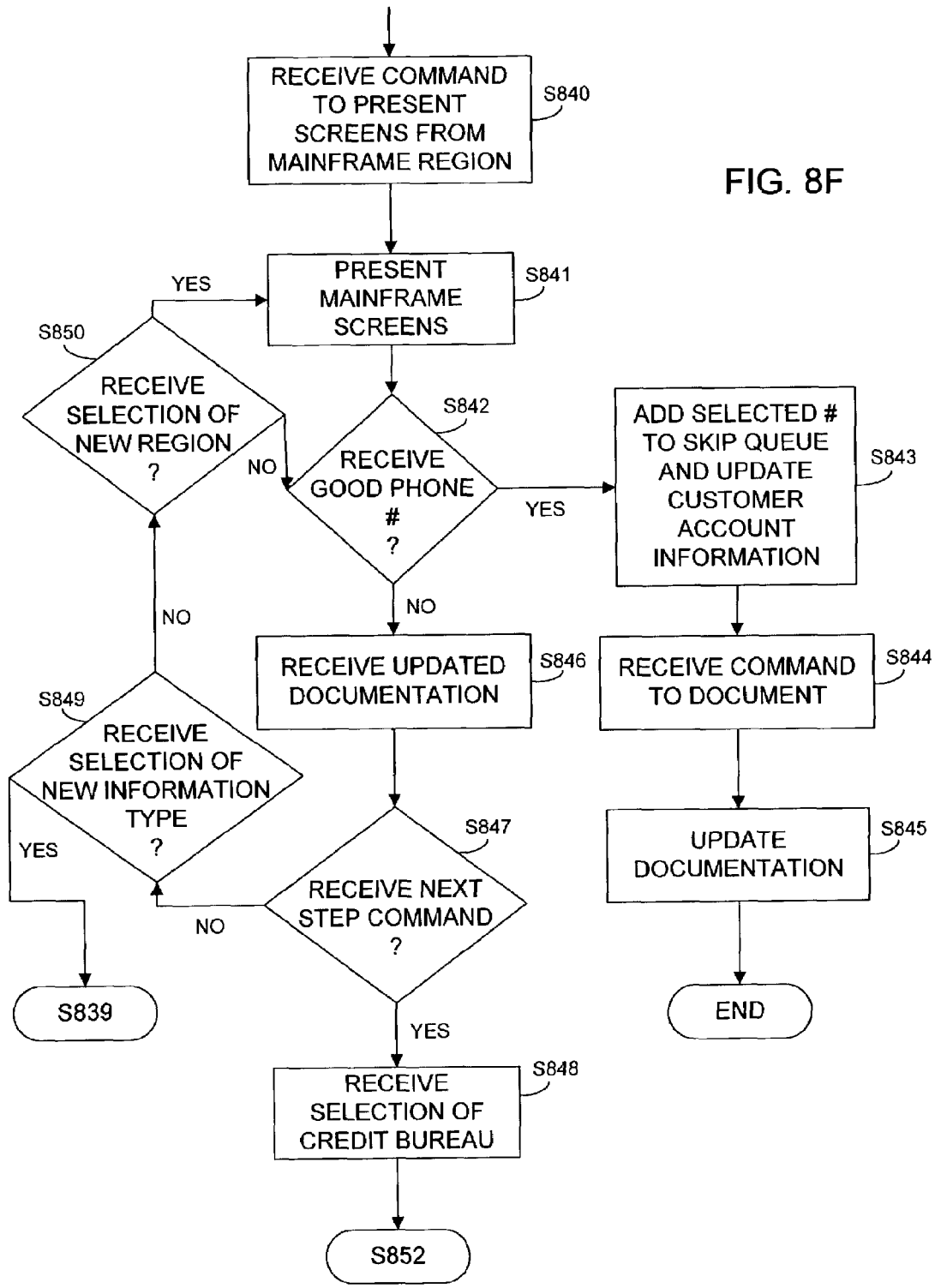
Figure 8G:
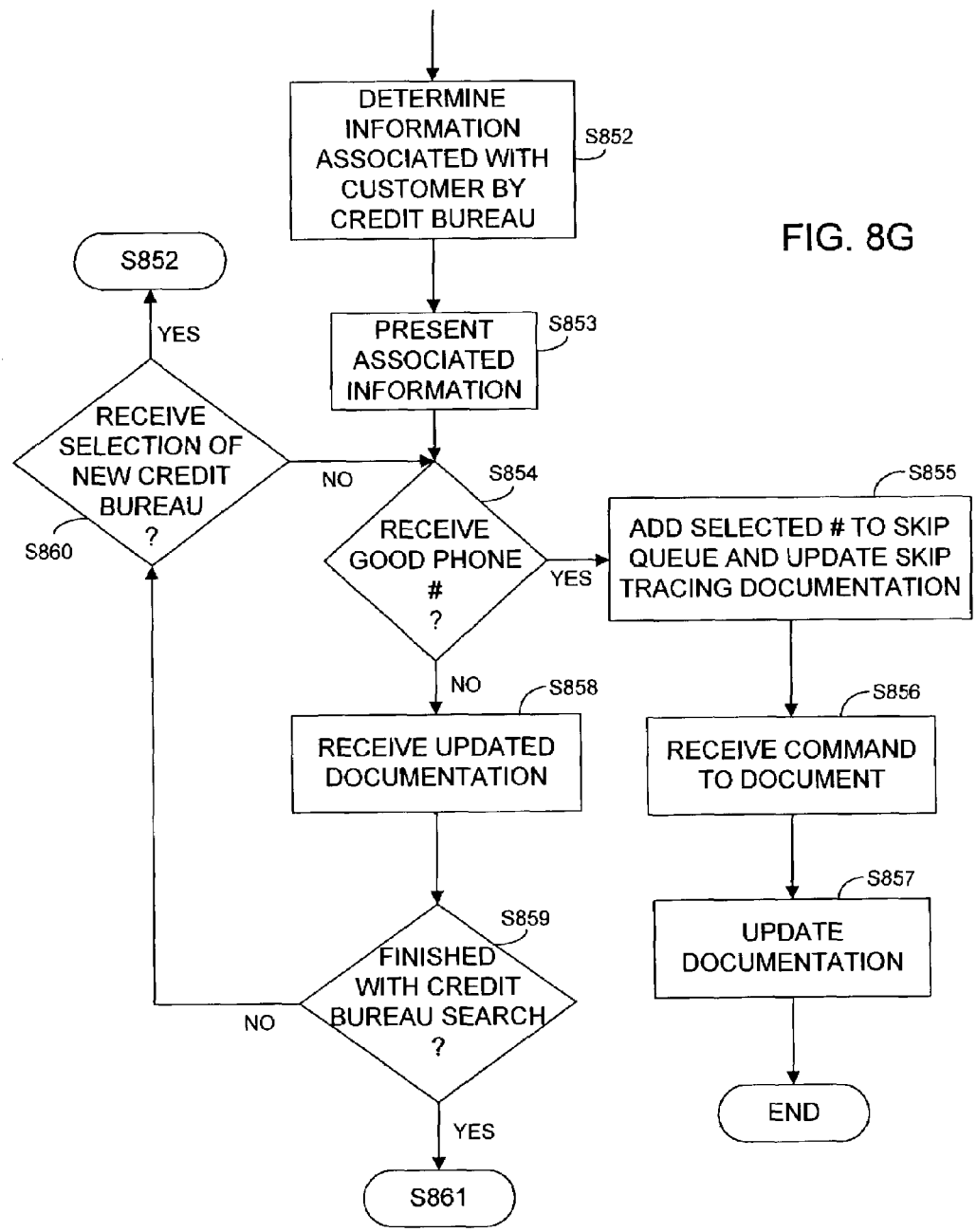
Figure 8H:
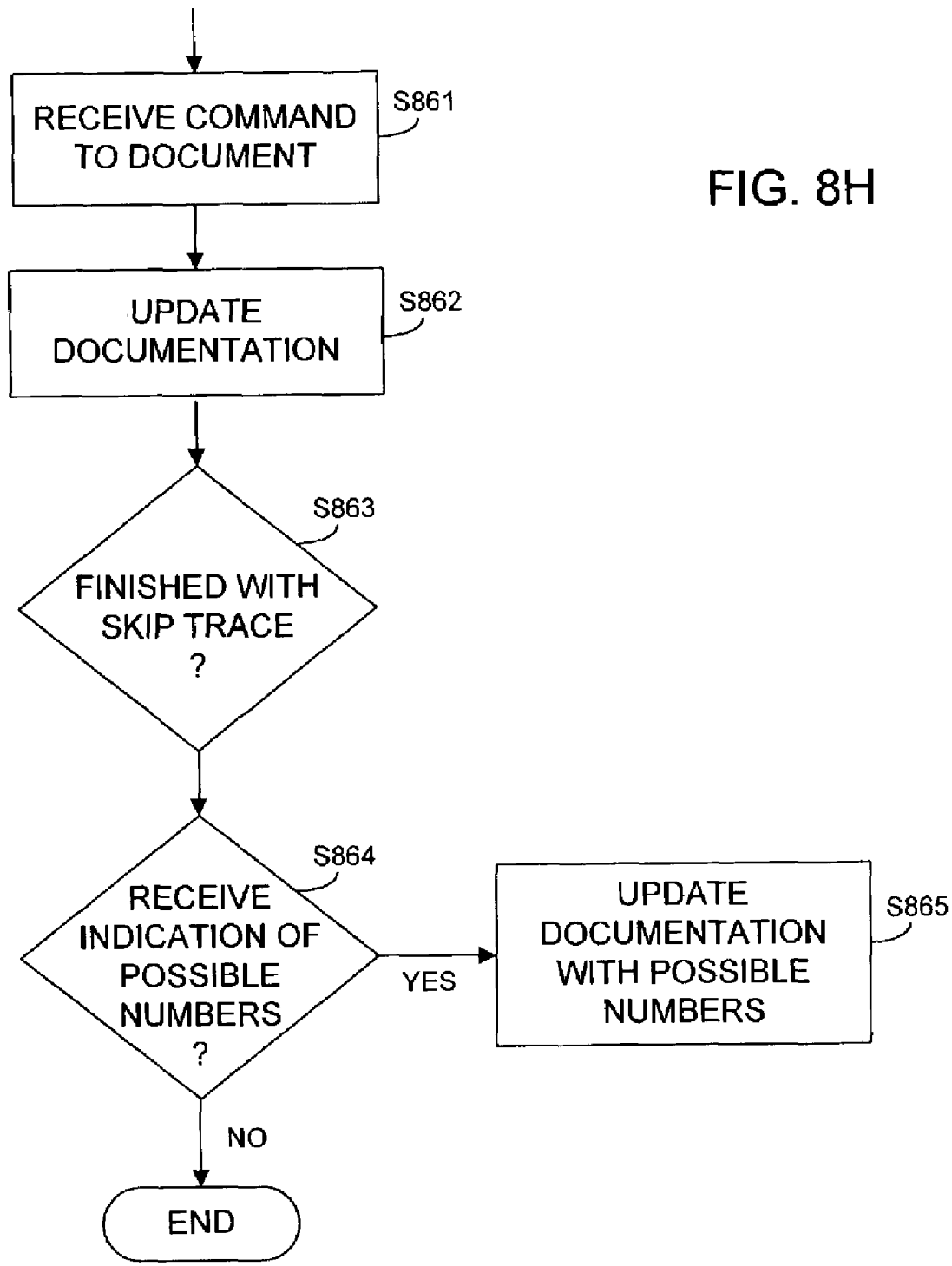

FIG. 3 is a block diagram of the internal components of user device 500 according to some embodiments of the invention. It should be noted that these distinct components may comprise any of the specific examples given above with respect to identically-named components of customer account device 200. Of course, specific functions performed by the components may differ from the functions performed by the identically-named components.

In operation, process steps of skip tracing application 592 are executed by microprocessor 510 to receive commands and data from a user, to request and receive appropriate information from devices 200 through 400, and to present user interfaces based thereon to a user. These process steps will be described in detail in conjunction with FIGS. 8A through 8H. The commands and data may be input via input device 540, and the interfaces may be presented to the user via display 550. Input device 540 and display 550 may also be used in conjunction with applications that are not directly related to the present invention.

The process steps of skip tracing application 592 may be read from a computer-readable medium, such as a floppy disk, a CD-ROM, a DVD-ROM, a Zip™ disk, a magnetic tape, or a signal encoding the process steps, and then stored in data storage device 590 in a compressed, uncompiled and/or encrypted format. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Data storage device 590 also stores user information database 594. Database 594 includes information that may be transmitted to devices 200 through 400 and used thereby to determine whether a user of user device 500 is authorized to access devices 200 through 400. As alluded to above, storage device 590 may store one or more of other applications, data files, device drivers and operating system files needed to provide functions other than those directly related to the present invention. Such functions may include calendaring, e-mail access, word processing, accounting, presentation development and the like.

Databases

A tabular representation of a portion of region 1 database 292 is shown in FIG. 4. As described above, the information stored in region 1 database 292 comprises account information associated with region 1. Each record of database 292 is therefore associated with an account number specified in account number field 401. Demographic information of a customer associated with the account number is specified in fields 402 through 405 of the record. This demographic information includes a customer Id, a name, an address and a social security number. It should be noted that a customer may comprise an entity as well as an individual.

Fields 406 through 408 of a record specify a balance, a minimum due and a due date associated with an account. These values may be used to determine accounts on which skip tracing should be performed. In addition, telephone numbers field 409 identifies telephone numbers associated with a particular account. These telephone numbers may be used during skip tracing of the account according to some embodiments of the present invention.

FIG. 5 illustrates a tabular representation of a portion of skip tracing documentation database 294. The records of skip tracing documentation database 294 include account number field 501 for specifying an account number, skip date field 502 for specifying a date on which skip tracing was last performed on the account, and skip result field 503 for documenting results of the last skip tracing. Some embodiments of the present invention provide a more efficient system for populating skip result database 503 than previously available. The results may be documented in prose or using any appropriate coding system. For example, the code "GD#" in skip result field 503 of FIG. 5 shows that the telephone number associated with account number "A272" in FIG. 4 was determined to be a good number.

A tabular representation of a portion of skip queue 295 is shown in FIG. 6. Skip queue 295 provides a queue used by a collections department to resolve delinquent accounts. In the FIG. 6 embodiment, the queue is arranged by record, with each record specifying an account (in account field 601) and a phone number (in phone number field 602) associated with an account. Records of skip queue 295 may be populated upon identification of a good telephone number during skip tracing according to some embodiments of the present invention. According to the present example, the telephone number associated with the account number "A272" in FIG. 4 was indicated as a good number in associated field 503 of FIG. 5, therefore the telephone number was placed in skip queue 295. In operation, collections department personnel access a first record of skip queue 295 and call the phone number specified in the record in an attempt to resolve the account specified in the record. The process is repeated for subsequent records.

Customer information device 300 stores customer information database 700, a tabular portion of which is represented in FIG. 7. As shown, customer information database 700 stores information associated with individuals. More specifically, an individual is identified in individual Id field 701, and a name, address, social security number, and telephone number corresponding to the individual are specified in associated fields 702 through 705. As mentioned above, the information of customer information database 700 is maintained by a directory information provider, and may be used to identify telephone numbers that are usable to resolve an account identified in customer account database 292 of customer account device 200.

It should be noted that the illustrations and accompanying descriptions of databases included herein merely represent relationships between stored information. A number of other arrangements may be employed besides those suggested, including arrangements in which some or all of the specified data is located remote from customer account device 200. It is further contemplated that each of the databases may include many more records than those shown and that each record may include associated fields other than those illustrated.

Skip Tracing Process

FIGS. 8A through 8H comprise flow diagram of process steps 800 according to some embodiments of the present invention. Process steps 800 are described below as if embodied in skip tracing application 592 and executed by microprocessor 510 of user device 500. However, process steps 800 may be embodied in one or more software or hardware elements and executed, in whole or in part, by any device or by any number of devices in combination, including devices 200 through 400.

Figure 9:
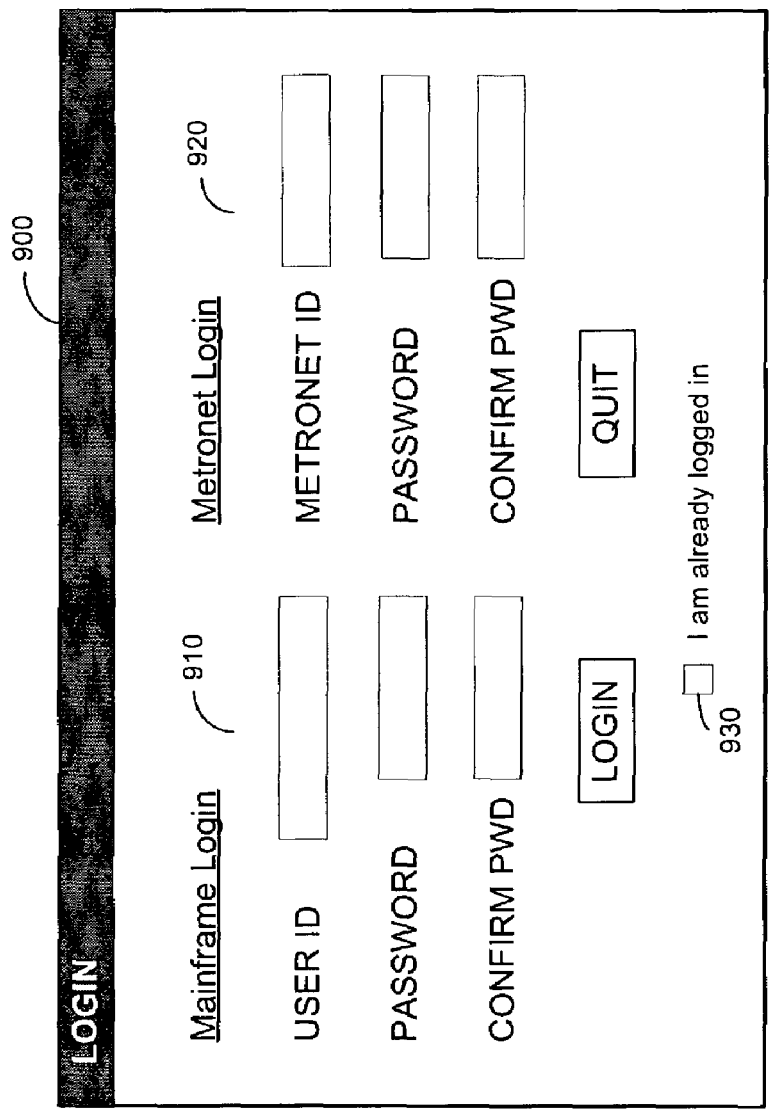
FIG. 9 is a representative view of an interface according to some embodiments of the present invention.

Prior to step S801, a user operates input device 540 of user device 500 in order to input a command to execute skip tracing application 592. In response, microprocessor 510 executes process steps of skip tracing application 592 to present a login window on display 550 in step S801. FIG. 9 is an outward view of login window 900 as presented to a user according to some embodiments of the present invention.

Login window 900 includes mainframe login area 910 and Metronet login area 920. Mainframe login area 910 provides fields in which the user inputs a user Id and password to access a mainframe region that includes customer account information. It should be noted that two or more mainframe regions may be located on one or more mainframe computer systems. The embodiment of FIG. 9 assumes that a single user Id and password can be used to access multiple mainframe regions. As a result, area 910 may be used to access multiple mainframe regions. In the present example, it will be assumed that login area 910 provides access to two or more mainframe regions provided by customer account device 200.

Metronet login area 920 provides fields in which the user inputs a user Id and password to access a Metronet mainframe system such as customer information device 300 that includes customer information such as that stored in customer information database 700. It should be noted that customer information providers other than Metronet may be used in conjunction with some embodiments of the invention. Moreover, in some embodiments the same user Id and password may be used to access mainframe regions storing customer account information and mainframe regions storing customer information.

Checkbox 930 is used to indicate that the user is already logged into the desired mainframes, and to proceed with further process steps of skip tracing application 592 without logging in to the mainframes. Checkbox 930 is used because errors may occur in some embodiments if skip tracing application 592 attempts to login to a mainframe computer system to which the user is already logged on.

Figure 10:
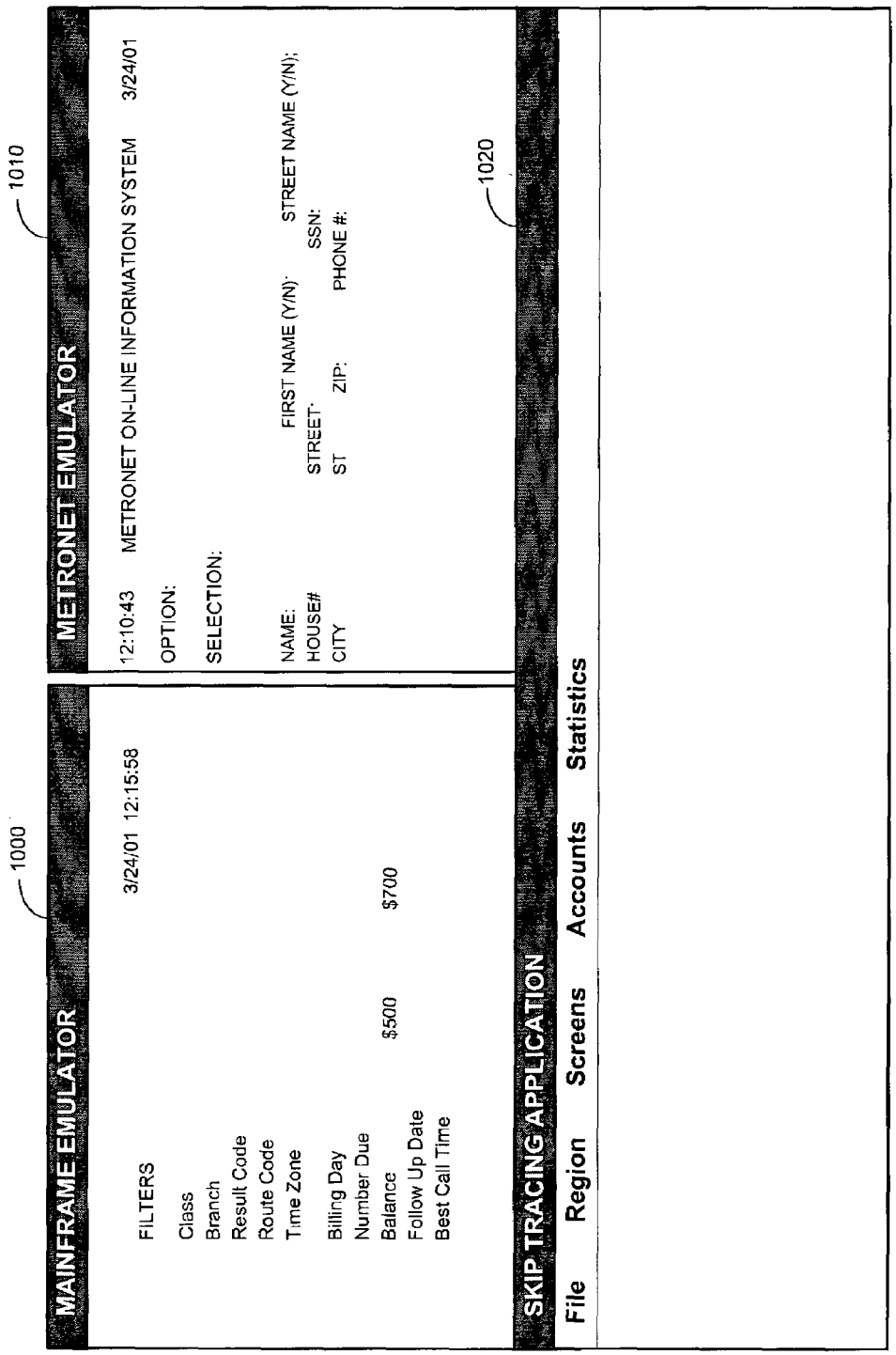
FIG. 10 is a representative view of an interface according to some embodiments of the present invention.

FIG. 10 illustrates windows 1000 through 1020 after successful login in step S801. As shown, windows 1000 and 1010 are mainframe terminal emulation windows corresponding to mainframe regions accessed through login areas 910 and 920, respectively. Other windows corresponding to mainframe regions accessed through login area 910 are presented "behind" window 1000. Window 1020 represents and is provided by skip tracing application 592 and, as will be described below, receives substantial user input during process steps 800.

A user defines skip tracing parameters in step S802 using window 1000. In particular, the user enters information defining customer accounts to be subjected to skip tracing. FIG. 10 shows that window 1000 has received parameters that specify customer accounts having outstanding balances between $500 and $750. Once the parameters have been received, they are transmitted to customer account device 200. Device 200 then uses the parameters to identify customer accounts that fulfill the parameters in step S803.

Figure 12:
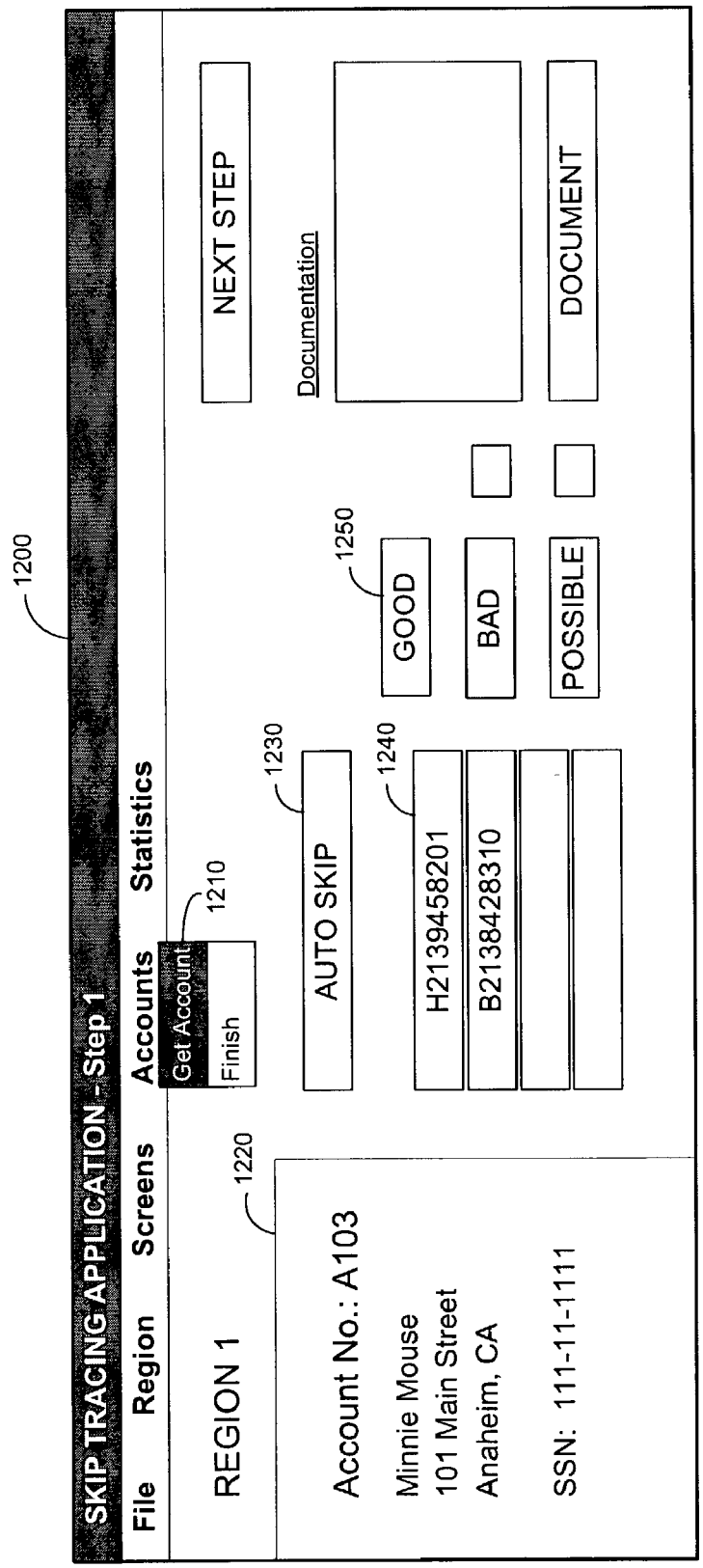
FIG. 12 is a representative view of an interface according to some embodiments of the present invention.

Window 1100 of FIG. 11 presents a customer account of a first customer identified in step S803. Next, in step S804, telephone numbers associated with the customer are determined. FIG. 12 will be used to describe determination of the phone numbers in step S804. As shown, the user uses input device 540 to select "Get Account" from pull-down menu 1210 of window 1200. In response, process steps of skip tracing application 295 are executed to retrieve account information from window 1100 of FIG. 11. The account information is then presented in account information area 1220. Such retrieval of mainframe data is generally known as data scraping, and may be provided using off-the-shelf software packages such as Attachmate Extra!™. Of course, some embodiments of the invention use other methods for retrieving data from mainframe computer systems and for presenting the data in a more user-friendly application environment.

The user then selects button 1230 and, as a result, the data of window 1100 is analyzed to determine telephone numbers therefrom. In one algorithm according to some embodiments of the present invention, each line of window 1100 is scanned to identify any eleven character strings that begin with one of the letters H (Home), B (Business), S (Spouse) and O (Other) and end with ten consecutive numbers. Of course, this algorithm is appropriate in the present example due to the format in which telephone numbers are presented in window 1100. Other formats may require different algorithms.

The phone numbers determined in step S804 are presented in telephone number area 1240 of window 1200, as shown in FIG. 12. In step S806, the user selects one of the presented phone numbers by "double-clicking" on one of the numbers using input device 540. The user than calls the selected number to determine if it is usable (good) to resolve delinquencies of the associated account. If so, the user selects Good button 1250 and it is thereby determined in step S807 that the selected telephone number is good. Accordingly, appropriate skip tracing documentation is generated in step S808.

Figure 13:
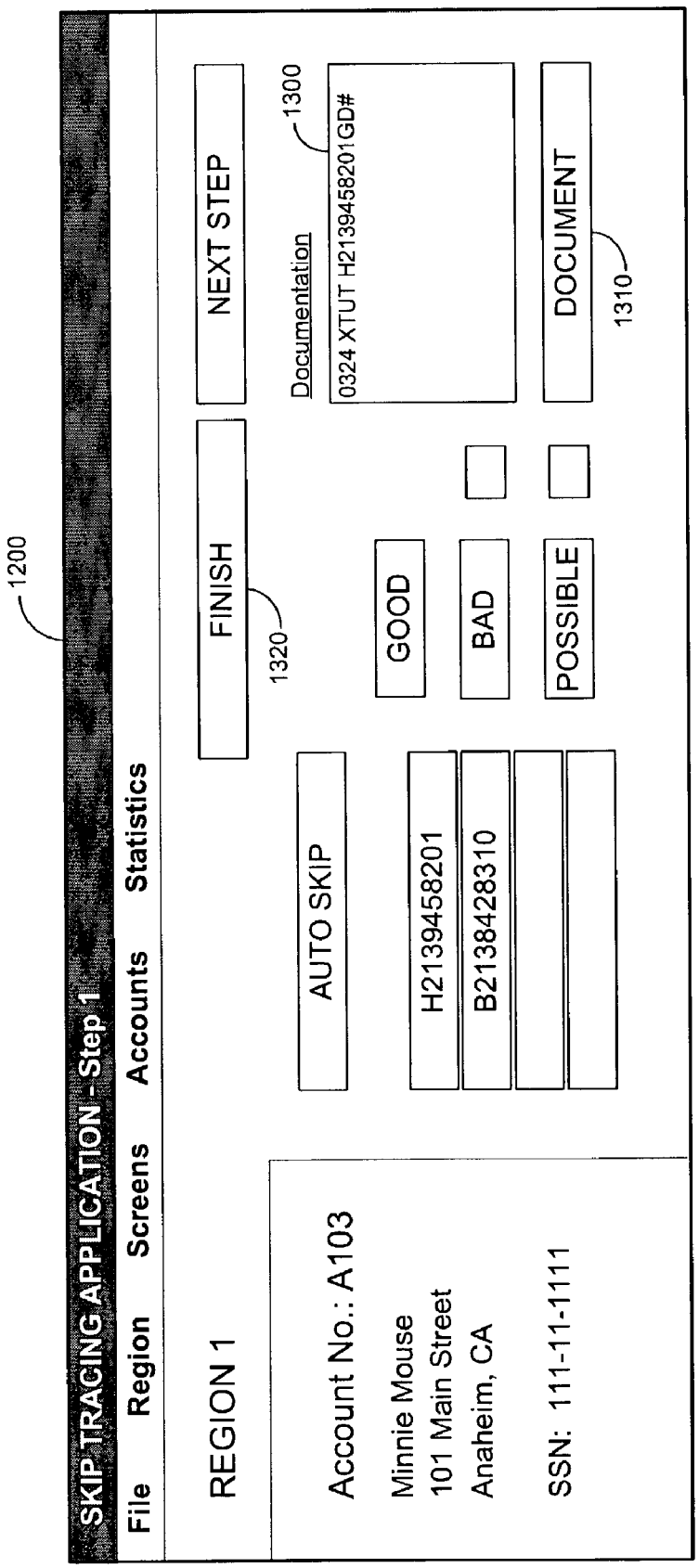
FIG. 13 is a representative view of an interface according to some embodiments of the present invention.

FIG. 13 illustrates window 1200 after step S808. As shown, the generated documentation is presented in documentation area 1300. Next, the user issues a command to document the documentation by selecting Document button 1310 and the command is received in step S809. The documentation is documented in step S810 by storing the documentation in skip result field 502 associated with the account in skip tracing documentation database 294.

The user then selects Finish button 1320 and a corresponding indication is received in step S811. In response, the selected telephone number is added to skip queue 295 and the associated customer account information shown in window 1100 and stored in region 1 database is updated to reflect the successful skip tracing in step S812. Process steps 800 then terminate.

Steps S810 and S812 include storing information in data structures of customer account device 200. This information may be stored using an application-to-mainframe communication tool such as Attachmate Extra!™, which provides automatic access of appropriate mainframe screens and automatic input to selected areas of the input screens, or another mainframe interface. In the illustrated embodiment, efficiency is improved by reducing a number of required user interface interactions and a burden on a user to switch between interfaces.

Figure 14:
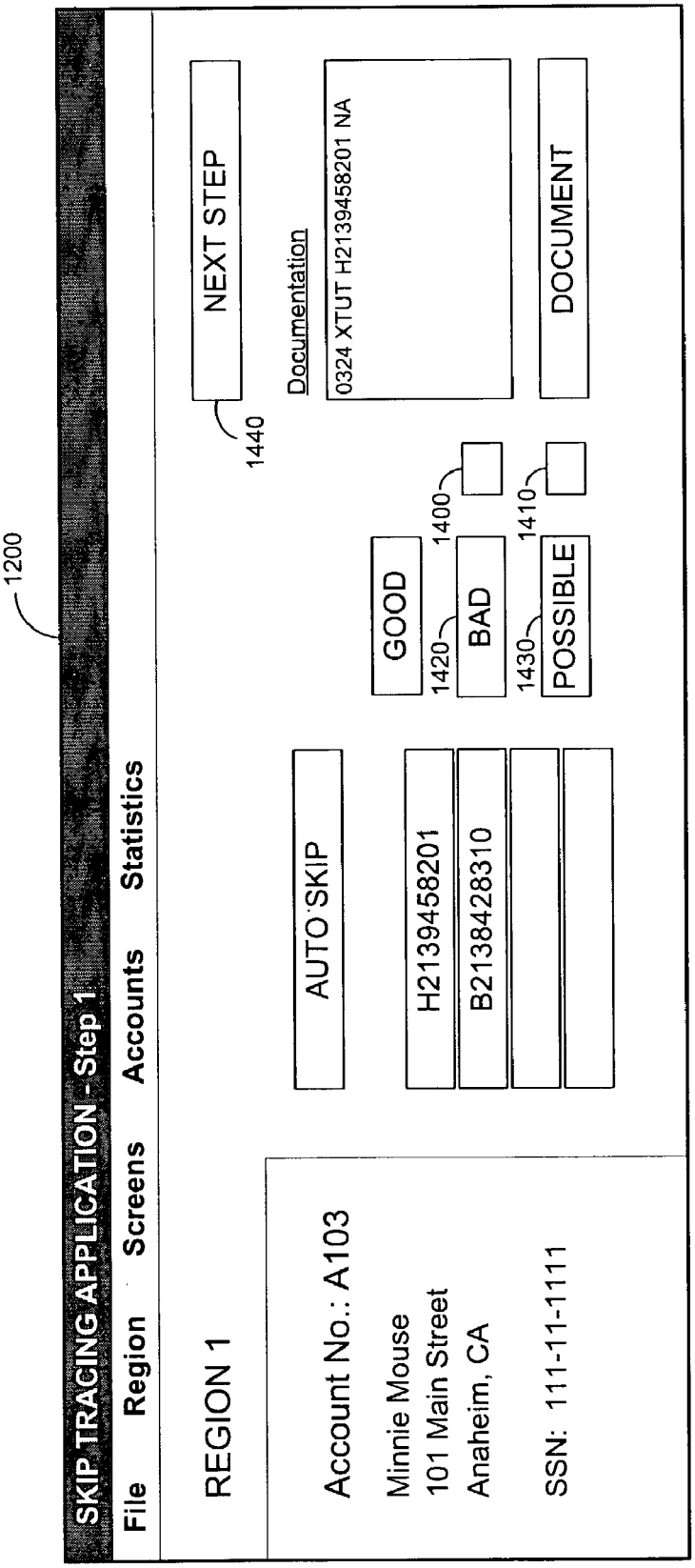
FIG. 14 is a representative view of an interface according to some embodiments of the present invention.

Returning to step S806, if the called telephone number is determined to be a bad or possible number, the user enters a code corresponding to the result of the call into one of code fields 1400 and 1410 of window 1200, as shown in FIG. 14. The user selects associated button 1420 or button 1430 and the determination in step S807 becomes negative. Documentation corresponding to the result is generated in step S813 and the documentation is presented in documentation area. In step S814, the user then selects Next Step button 1440 and skip tracing application 592 receives an associated command to go to a next step.

Alternatively, the user may select another number from telephone number area 1240 in step S814. In such a case, flow returns to step S806 and continues as described above. It is preferable in some embodiments for the user to select, call and document each telephone number presented in telephone number area 1240 before selecting Next Step button 1440.

More telephone numbers associated with the account are determined in step S815 in response to selection of Next Step button 1440. In the present embodiment, the telephone numbers are determined by accessing several mainframe screens associated with the account and by scraping possible telephone numbers therefrom. According o a specific example, each line of each screen is analyzed beginning at the 27$^{th}$ column. If digits are identified in three successive columns of a line, the entire line from column 27 through column 72 is retrieved. Again, the effectiveness of this algorithm depends on the formatting of data in the mainframe screens. Advantageously, this algorithm is less format-dependent than the algorithm described with respect to step S804 and therefore may be more successful in identifying associated telephone numbers.

FIG. 15 shows window 1500 presenting the telephone numbers determined in step S815. The telephone numbers are presented in area 1510 along with an indication of the mainframe screen from which they were determined. As shown, some of the lines of area 1500 do not present telephone numbers. This presentation is due to the roughness of the step S815 algorithm, which beneficially extracts some possibly relevant data from a large amount of data but still allows for some human judgment in identifying telephone numbers.

Figure 16:
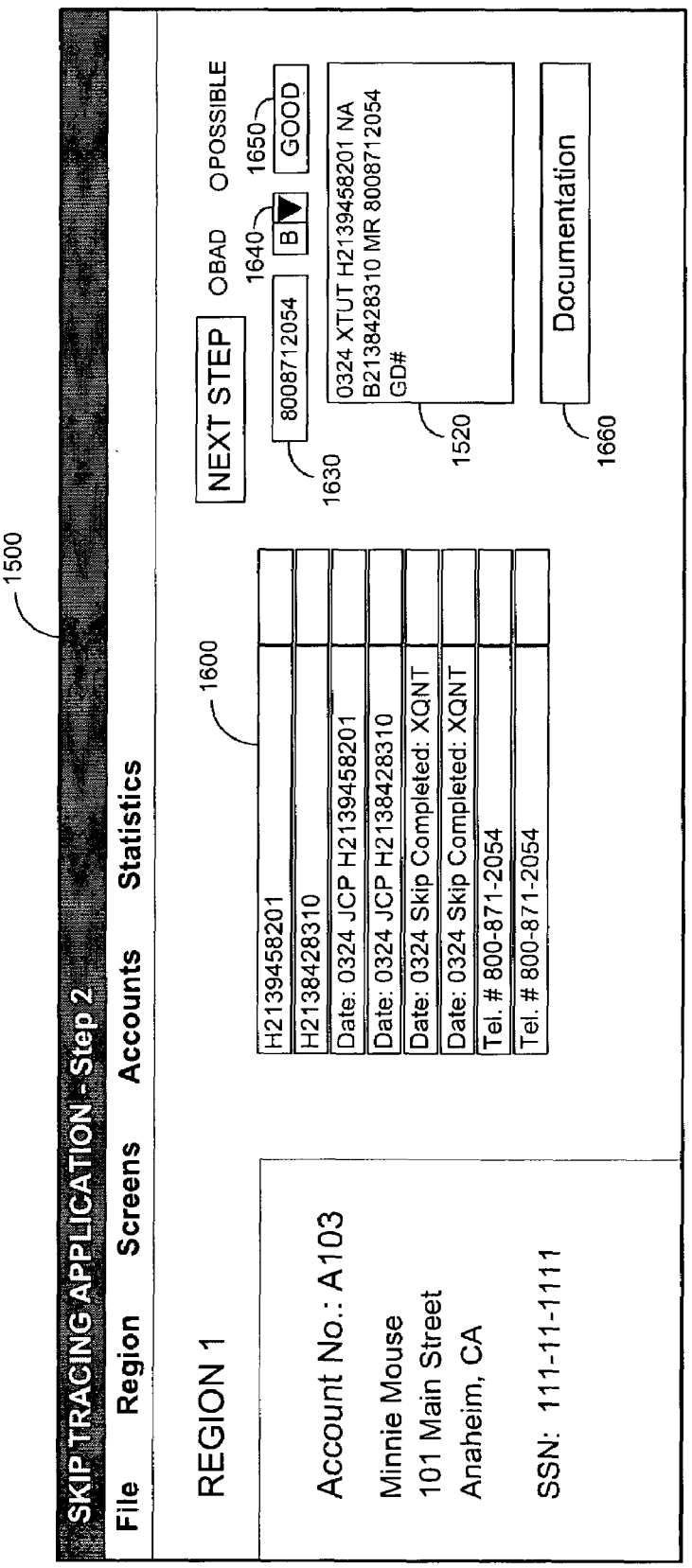
FIG. 16 is a representative view of an interface according to some embodiments of the present invention.

Window 1500 also presents documentation area 1520, which shows documentation generated in step S813. In this regard, it is assumed that step S813 was performed once for each telephone number presented in telephone number area 1240. The presentation of earlier-generated documentation in area 1520 makes it easy for the user to determine what numbers have already been called during the current skip tracing process. One of the presented telephone numbers (preferably one that has not already been called) is selected and the selection is received in step S817. FIG. 16 shows window 1500 after step S817, in which line 1600 was selected and the associated sequence of digits was automatically presented in documentation area 1520.

The user calls the selected number and documents a result of the call next to the number in area 1520. Assuming the number is good, the user copies the number into good number field 1630, selects an appropriate identifier from pull-down menu 1640, and selects Good # button 1650. It is then determined in step S818 that the selected number is good and flow proceeds to step S819.

At step S819, the customer account information shown in window 1100 and stored in region 1 database is updated to reflect the successful skip tracing and the selected telephone number is added to skip queue 295 as described with respect to step S812. A command to document the skip tracing is then received as a result of user selection of button 1660 and associated skip result field of database 294 is updated with the documentation presented in area 1520.

If the user determines that the selected telephone number is not good after step S817, the user enters an appropriate code next to the number in area 1520, as shown in FIG. 17. It is then determined whether the user has selected Next Step button 1700 and one of check buttons 1710 and 1720 in step S822. If not, then a selection of a new telephone number is received in step S817 and flow preferably continues as described above until all telephone numbers shown in area 1510 have been called or until a good number is determined.

Figure 18:
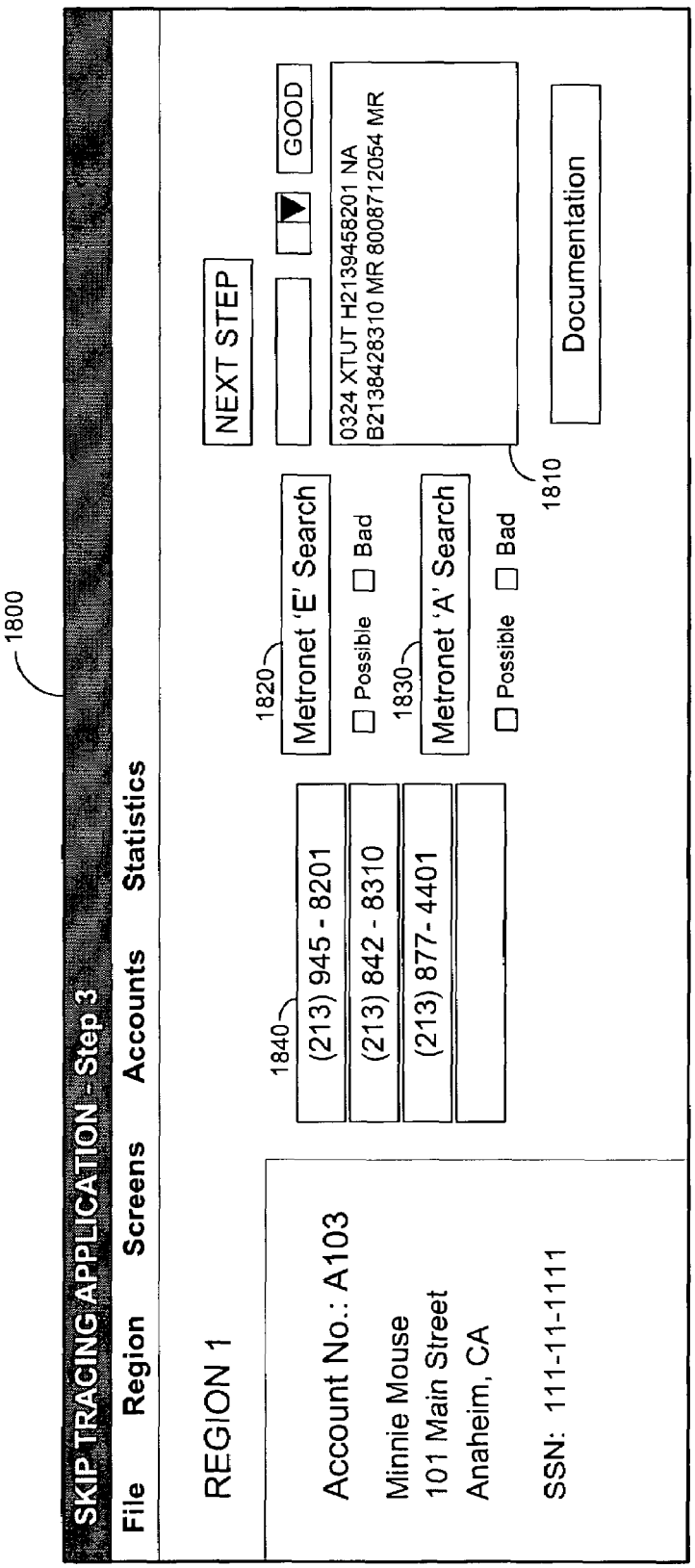
FIG. 18 is a representative view of an interface according to some embodiments of the present invention.

If the determination of step S822 is positive, region 1 database 291 is updated in step S823 to reflect the unsuccessful skip tracing that was performed based on the information stored therein. After step S823, window 1800 of FIG. 18 is presented to the user. Window 1800 allows the user to perform skip tracing using the information stored in customer information device 300. Again, window 1800 includes documentation area 1810 that carries over the documentation generated in previous windows 1200 and 1500.

The user selects one of buttons 1820 and 1830 to indicate a type of search to be performed by customer information device 300. Then, in step S825, telephone numbers are determined from customer information database 700 using the selected search type. The determined numbers are presented in number area 1840 of window 1800 in step S826. In the present example, field 705 of database 700 associates one telephone number with the subject customer that is not associated with the customer in region 1 database 292. Accordingly, number area 1840 presents the one telephone number in addition to the other telephone numbers of field 705, which were previously presented in areas 1240 and 1510.

As described with respect to step S817, the user selects a number from area 1840, the selection is received in step S827 and the selected number is presented in documentation area 1810. After calling the number, the user indicates a result of the call in documentation area 1810.

Figure 19:
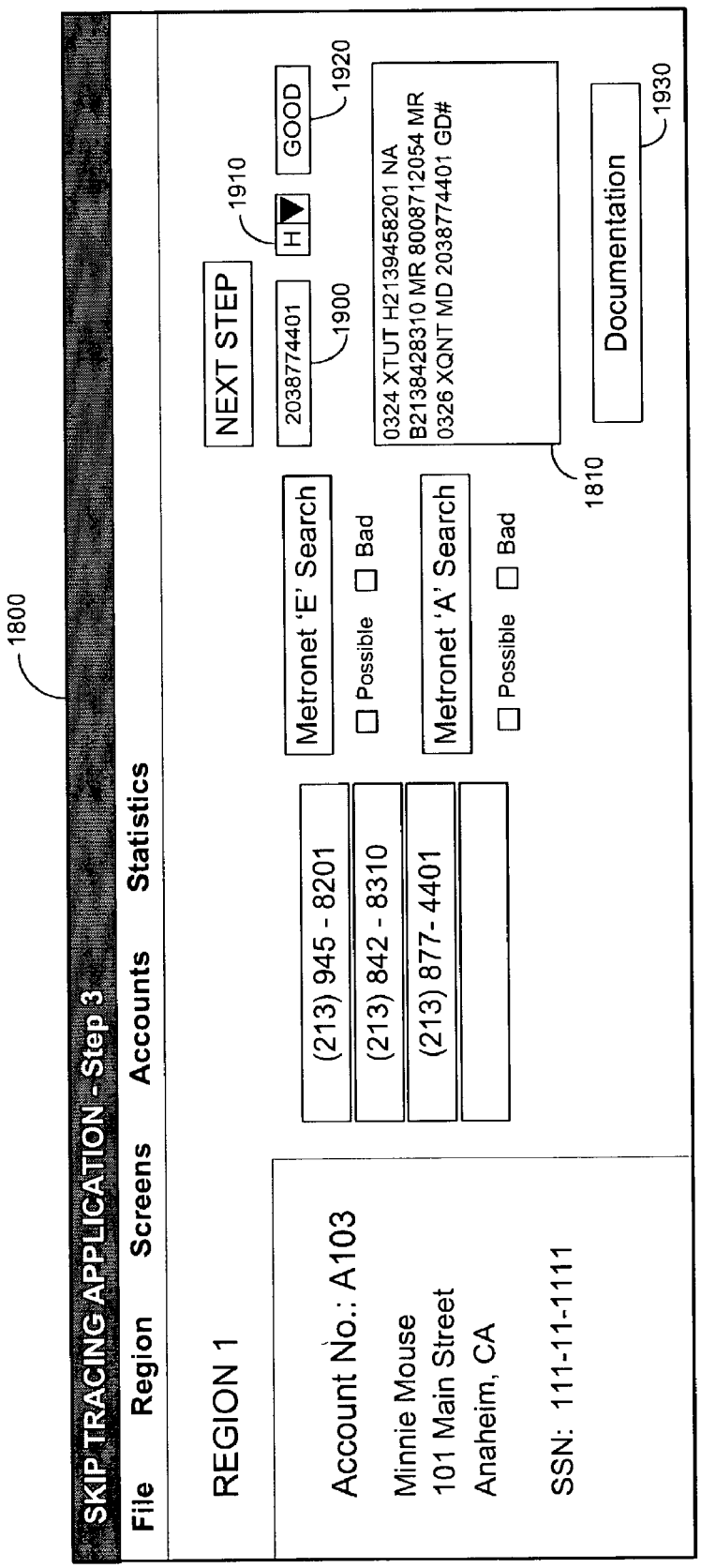
FIG. 19 is a representative view of an interface according to some embodiments of the present invention.

FIG. 19 shows window 1800 after a number is selected and determined to be good by the user. As shown, the user has indicated that the selected number is good in documentation area 1810, has copied the number into good number field 1900, and has associated a type with the number in pull-down menu 1910. The user then selects Good button 1920 and the number is therefore determined to be good in step S828.

Flow proceeds through steps S829, S830 and S831 as described above with respect to steps S819 through S821, with the user selecting Documentation button 1930 in step S830.

Figure 20:
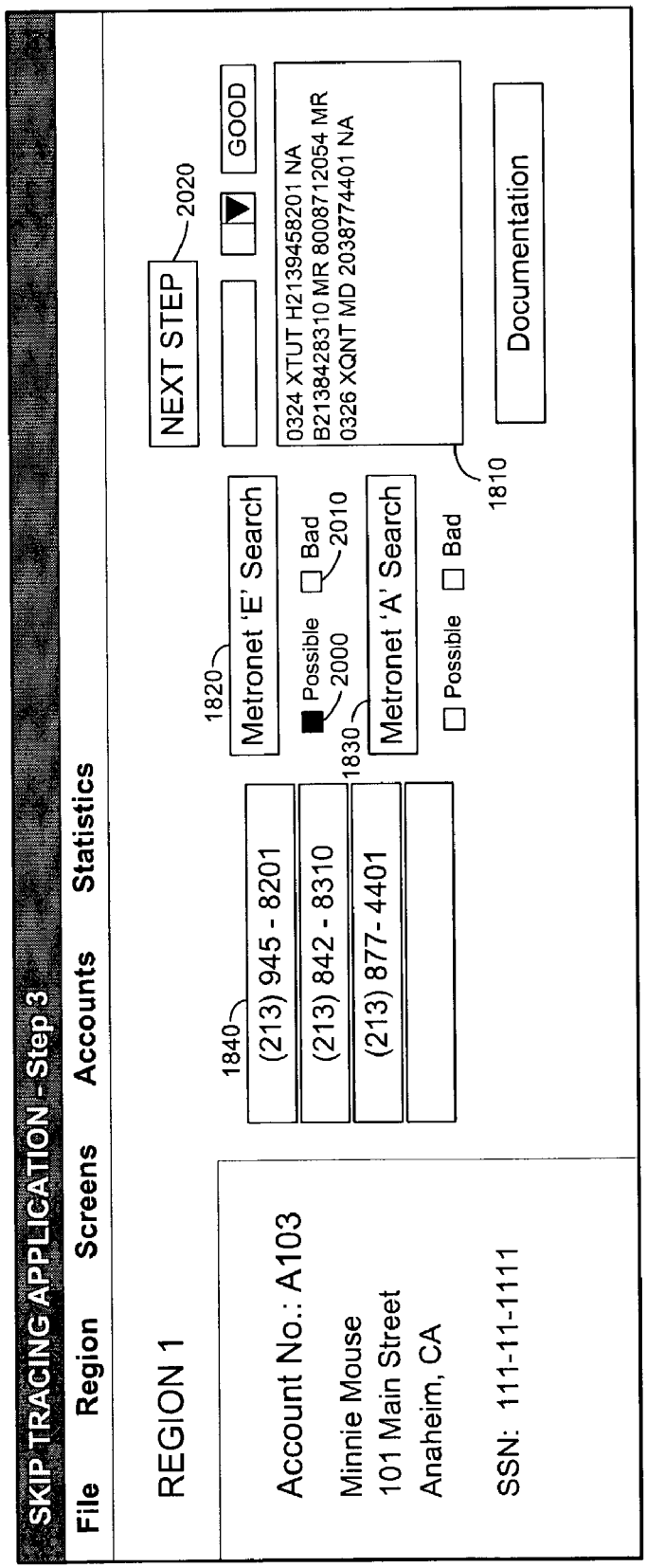
FIG. 20 is a representative view of an interface according to some embodiments of the present invention.

The user does not select Good button 1920 if the user determines that the selected number is not good after step S827. Rather, flow continues through step S828 to step S832, wherein the user selects one of checkboxes 2000 and 2010 as shown in FIG. 20. Upon selection of one of the checkboxes, an appropriate code is appended to the selected number in step S833, as shown in documentation area 1810 of FIG. 20.

Next, in step S834, flow is returned to step S825 if button 1830 is selected to initiate another type of search of customer information device 300. If button 1830 is not selected and if Next Step button 2020 is not selected, flow proceeds from step S835 to step S827 for selection of another number from area 1840. On the other hand, flow continues to step S836 from step S835 if it is determined that Next Step button 202 was selected in step S835. Region 1 database 292 is updated in step S836 to reflect the current skip tracing process.

Figure 21:
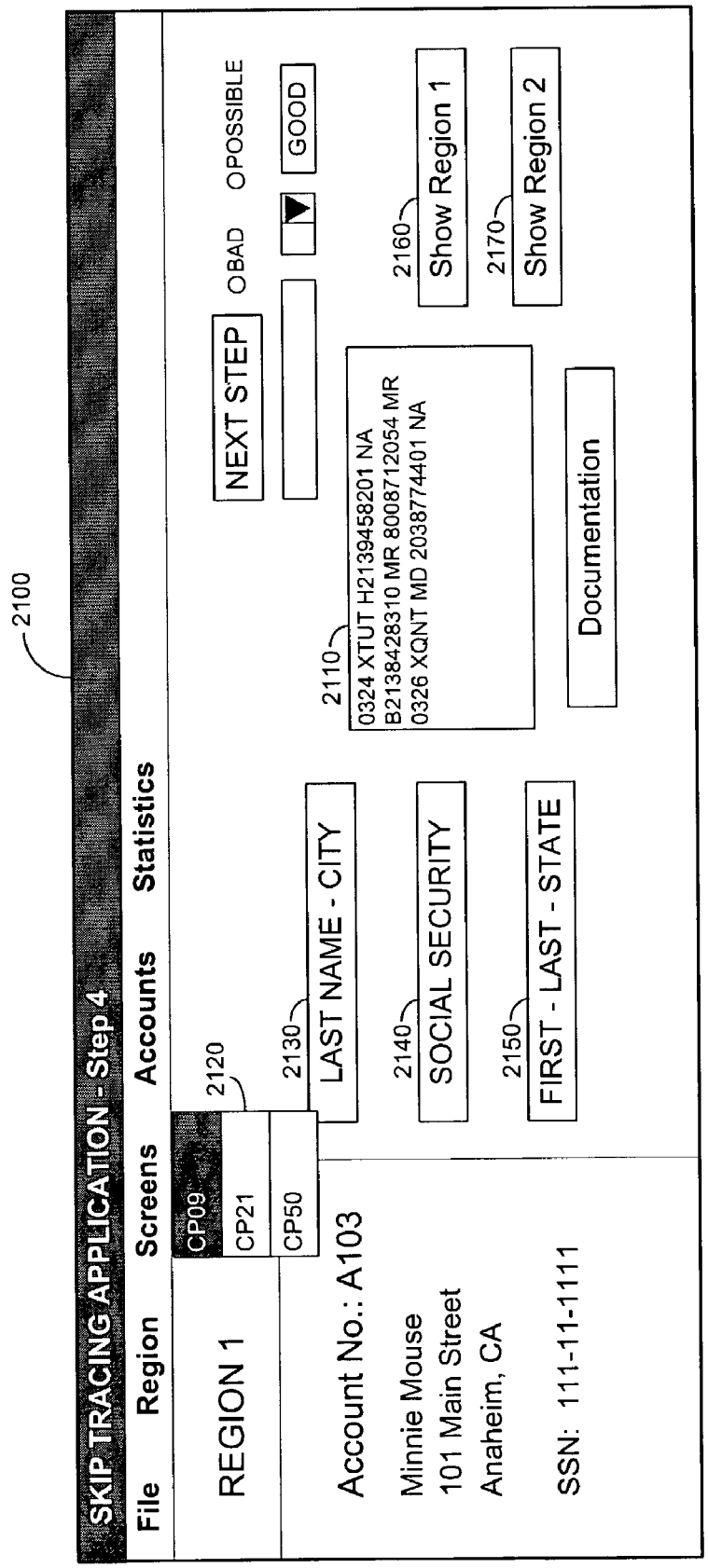
FIG. 21 is a representative view of an interface according to some embodiments of the present invention.

Window 2100 of FIG. 21 is presented to the user after step S836. Window 21 includes documentation area 2110, which presents documentation generated in previous documentation areas 1300, 1520 and 1810. The user selects a mainframe screen from pull-down menu 2120 and the selection is received in step S837. Next, the user selects an information type using one of buttons 2130 through 2150 and the selection is received in step S838. In step S839, customers are identified in each available mainframe region whose information of the selected type is identical to the subject customer's information of the selected type, and the selected mainframe screen of each customer is accessed. If button 2130 is selected, for example, all customers of region 1 and region 2 who have the same last name and city as the subject customer are identified and a CP09 mainframe screen for each customer is accessed.

The user then selects one of buttons 2160 and 2170, which is interpreted in step S840 as a command to present the customer account information shown in the mainframe screens of the selected region that were accessed in step S839. Accordingly, the mainframe screens associated with the selected regions are presented in step S841. The user peruses the presented screens in an attempt to identify uncalled good telephone numbers. In the present example, the customer associated with account number "A288" in database 292 has a same last name and city as the subject customer. Accordingly, a mainframe screen corresponding to the customer is presented in step S841 and the user identifies a number associated with the customer in telephone numbers field 409 that was not previously associated with the subject customer. The user therefore calls the identified telephone number after step S841.

Figure 22:
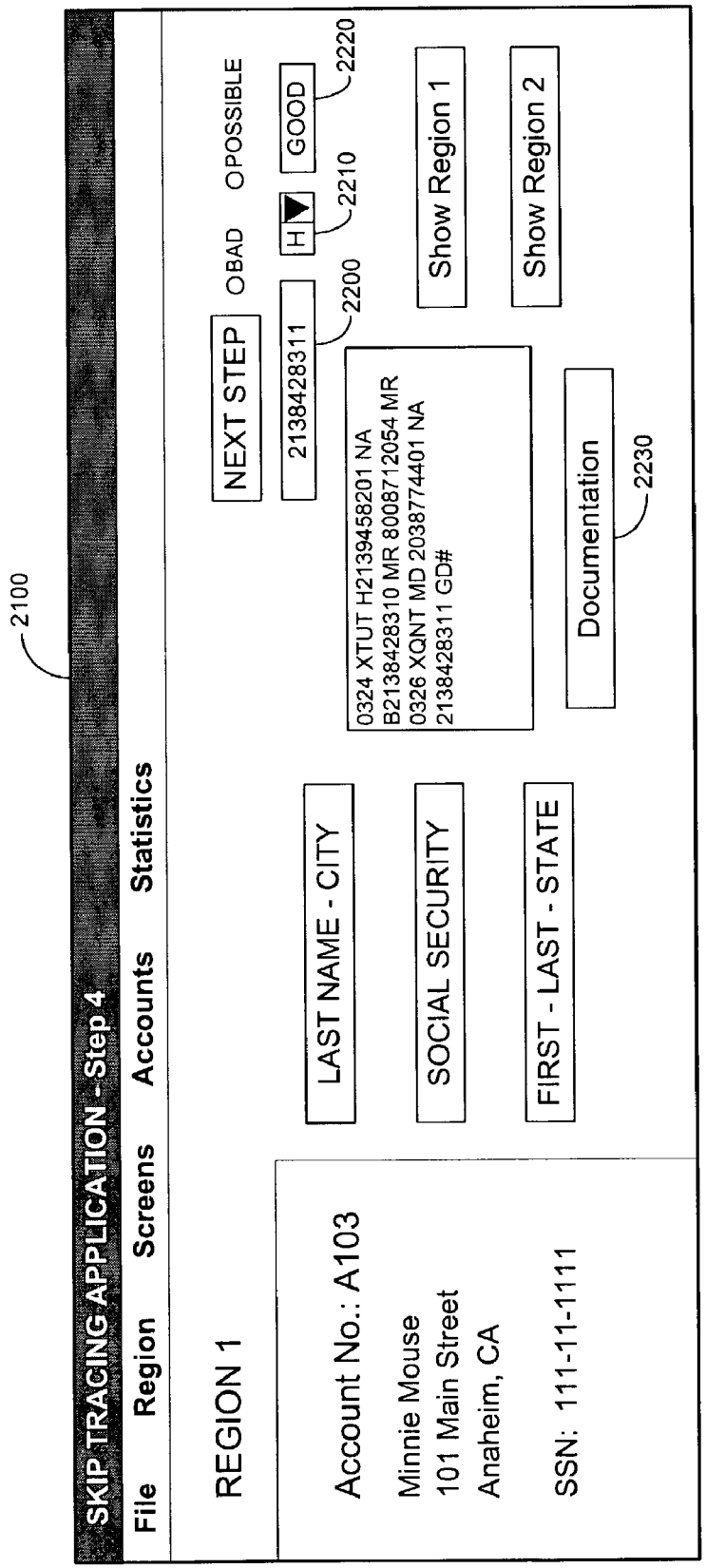
FIG. 22 is a representative view of an interface according to some embodiments of the present invention.

FIG. 22 shows window 2100 in a case that a good number is identified in the presented mainframe screens. In particular, the user has indicated that the selected number is good in documentation area 2110, has copied the number into good number field 2200, and has associated a type with the number in pull-down menu 2210. The user then selects Good button 2220 and the number is therefore determined to be good in step S842. Flow proceeds through steps S843, S844 and S845 as described above with respect to steps S819 through S821 and steps S829 through S831, with the user selecting Documentation button 2230 in step S844.

Figure 23:
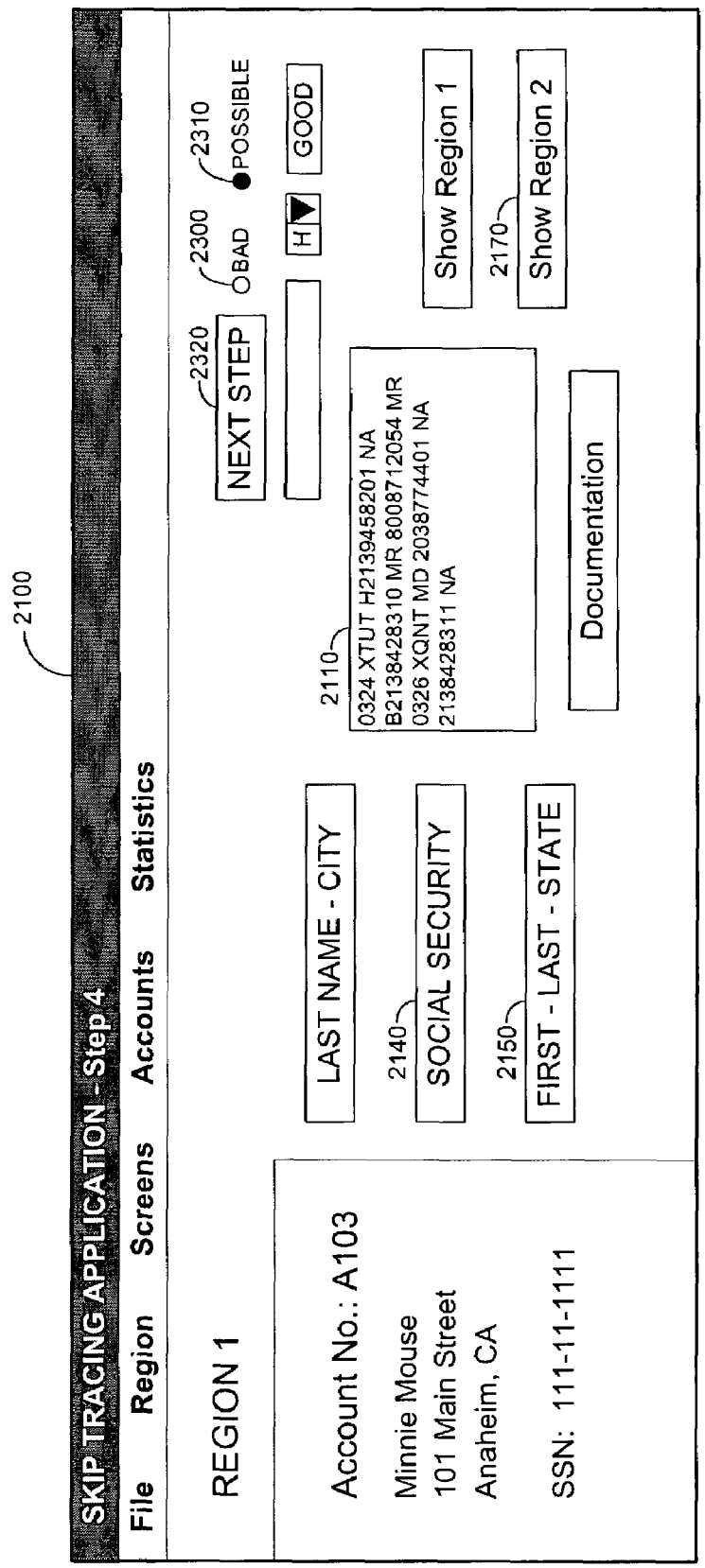
FIG. 23 is a representative view of an interface according to some embodiments of the present invention.

The user does not select Good button 2220 if the user determines that the telephone number identified after step S841 is not good. Instead, flow proceeds to step S846, where the user updates documentation area 2110 based on the results of calling the number. FIG. 23 shows window 2100 and documentation area 2110 in a case that the identified number was not determined to be good. The user may then choose one of checkboxes 2300 and 2310 to indicate that the numbers shown in documentation area 2110 are bad or possible, and select Next Step button 2320. In response, flow would continue to step S848.

If the user does not select button 2320, the user may select one of buttons 2140 or 2150. In this case, flow returns to step S839 to access mainframe screens associated with customers for whom information of the type associated with the selected button is identical to that of the subject customer. If neither button 2140 nor button 2150 is selected, the user may select button 2170 to present mainframe screens of the region associated with button 2170 that were accessed in step S839. In this case, flow returns to step S841 for presentation of the screens. If button 2170 is not selected, it is again determined in step S842 whether a number by the user in the presented mainframe screens is good.

Again, flow arrives at step S848 if Next Step button 2320 is selected in step S847. FIG. 24 shows window 2400 that is presented in step S848. Window 2400 includes documentation area 2410 reflecting activities of a current skip tracing process, and buttons 2420 through 2440, each of which are associated with a respective credit bureau. The user selects one of buttons 2420 through 2440 and the selection is received in step S848.

In step S852, information associated with the subject customer is retrieved from the credit bureau associated with the selected button. According to some embodiments, user device 500 requests the information from credit bureau device 400 and the information is transmitted from credit bureau device 400 to user device 500 in step S852. The information is then presented to the user in step S853 within a mainframe emulator window on display 550. The user identifies a previously-uncalled telephone number from the presented information and calls the number to determine if the number is good.

Figure 25:
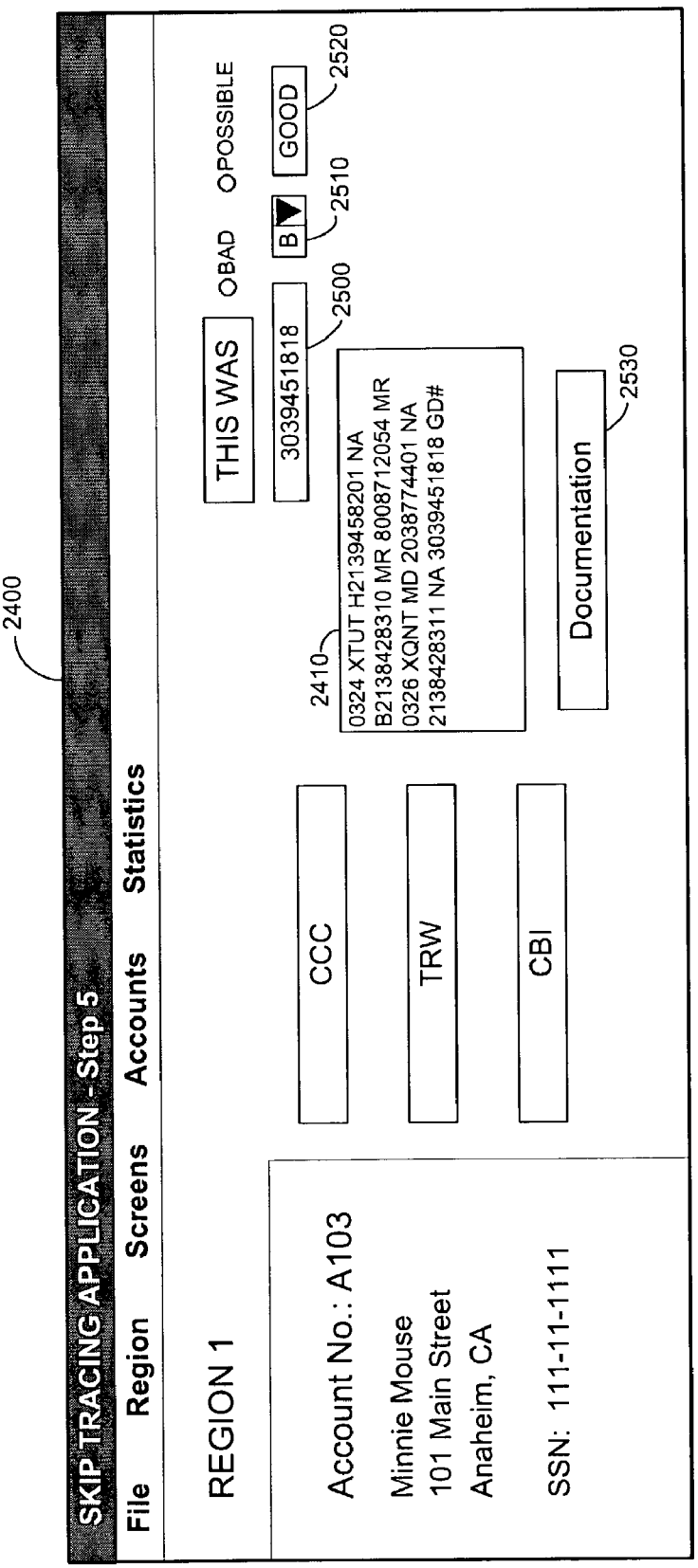
FIG. 25 is a representative view of an interface according to some embodiments of the present invention.

FIG. 25 shows window 2400 in a case that the number is good. Specifically, the user has copied a number into documentation area 2410, added a code to the copied number indicating that the selected number is good, copied the number into good number field 2500, and associated a type with the number in pull-down menu 2510. The user then selects Good button 2520 and the number is therefore determined to be good in step S854. Flow proceeds through steps S855, S856 and S857 as described above with respect to steps S843 through S845, with the user selecting Documentation button 2530 in step S856.

Figure 26:
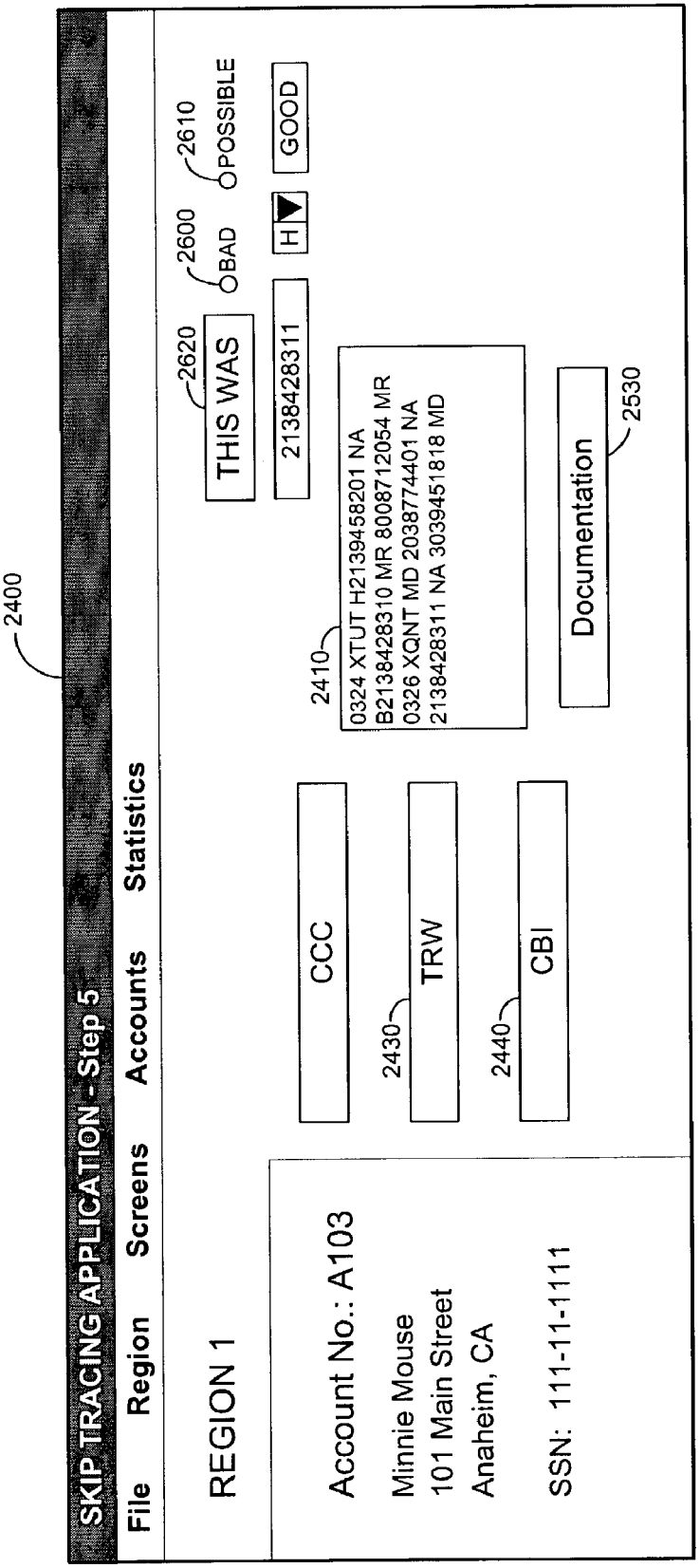
FIG. 26 is a representative view of an interface according to some embodiments of the present invention.

The user does not select Good button 2520 if the user determines that the telephone number identified after step S853 is not good. Instead, flow proceeds to step S858, where the user updates documentation area 2410 based on the results of calling the number. FIG. 26 shows window 2400 and documentation area 2410 in a case that the identified number was not determined to be good. The user may then choose one of checkboxes 2600 and 2610 to indicate that the numbers shown in documentation area 2410 are bad or possible.

In step S859, it is determined whether the user is finished with the search of credit bureau information. More specifically, it is determined that the user is not finished and flow proceeds to step S860 in a case that the user does not select This Was button 2620 of window 2400. It is then determined whether the user has selected one of buttons 2430 or 2440 in step S860. In this case, flow returns to step S853 to determine and present information associated with the customer by the credit bureau associated with the selected button.

Flow proceeds from step S859 to step S861 in a case that the user selects This Was button 2620 in step S859. A selection of Documentation button 2530 is received in step S861 and skip tracing documentation database 294 is updated using the information shown in documentation area 2410. FIG. 5 shows field 503 of database 294 after being updated in step S862 of the present example.

Figure 27:
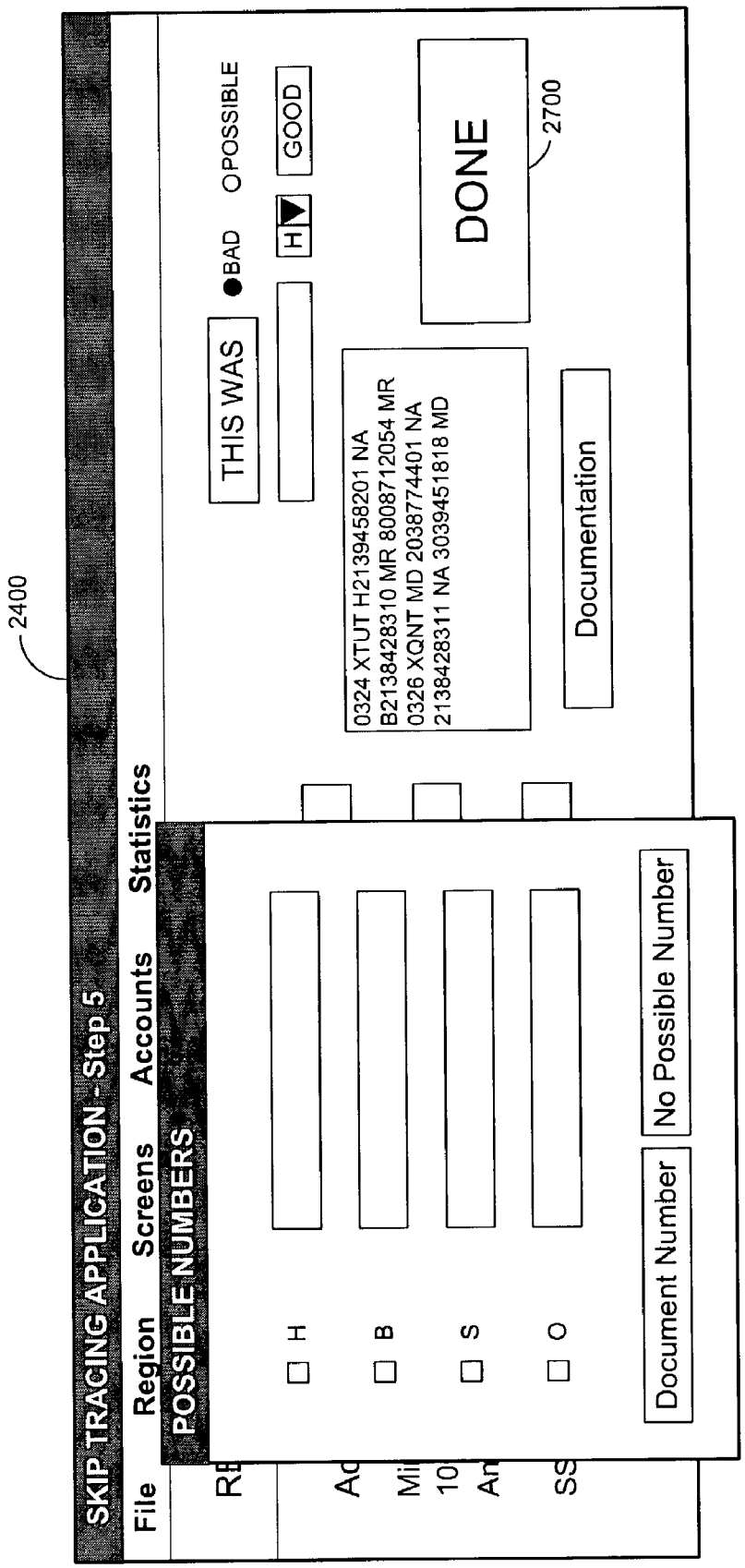
FIG. 27 is a representative view of an interface according to some embodiments of the present invention.
Figure 28:
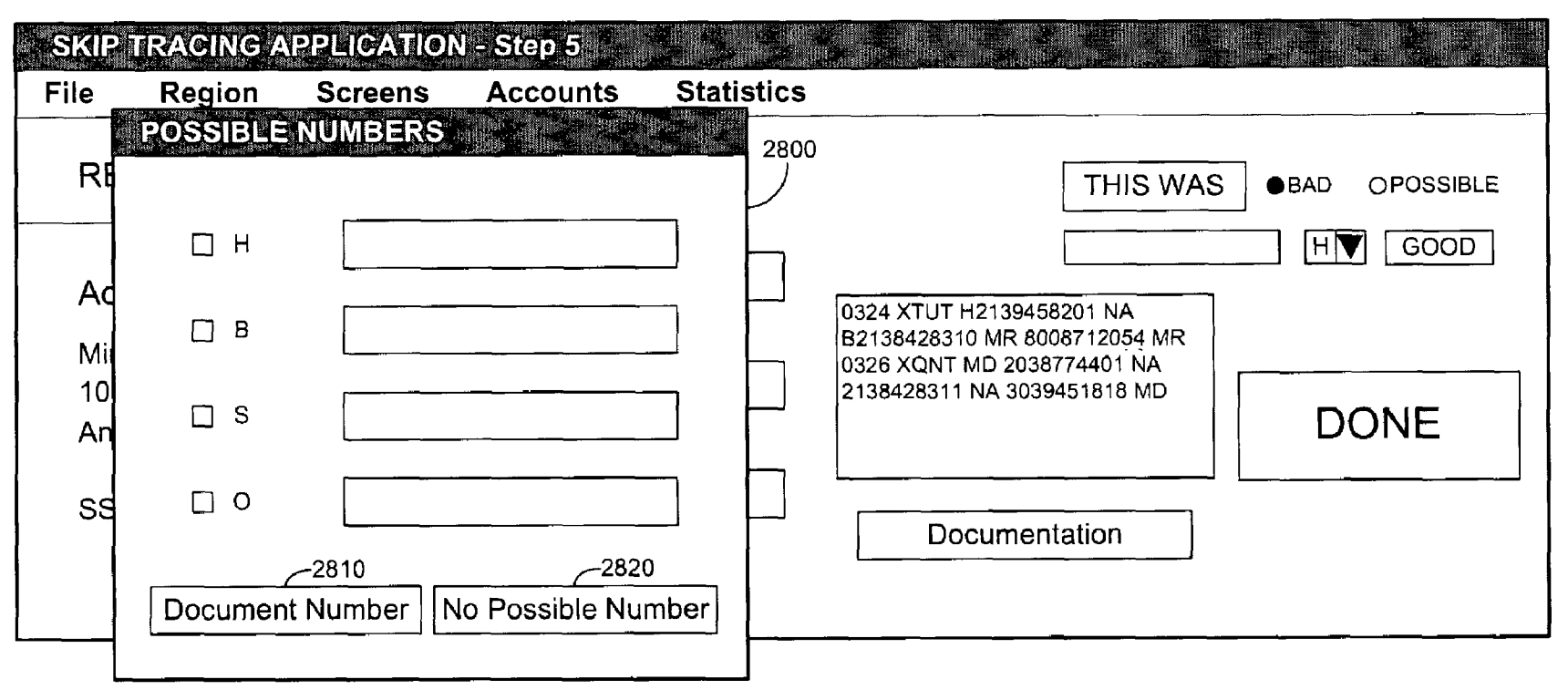

FIG. 27 shows window 2400 after step S862. As shown, window 2400 now includes Done button 2700. Done button 2700 may be selected by the user to indicate that the user has finished skip tracing the subject account. Accordingly, flow pauses at step S863 until the user selects button 2700. After button 2700 is selected, window 2800 is presented as shown in FIG. 28. Window 2800 includes fields for specifying any possible numbers that turned up during skip tracing and for indicating a type for each possible number.

The user selects Document button 2810 if numbers are entered into the fields of window 2800. As a result, the determination in step S864 is positive, the entered numbers are used in step S865 to update skip tracing documentation database 294, and process steps 800 terminate. If no numbers are entered, the user selects No Possible Numbers button 2820, the determination in step S864 is negative, and process steps 800 terminate.

Systems according to some embodiments of the present invention thereby provide efficient and accurate skip tracing of telephone numbers. It should be noted that user interfaces according to some embodiments of the present invention may include fewer or more features and may be arranged differently than as shown. Moreover, all or some of the features of a single user interface described above may be located within one or more user interfaces, and features of several user interfaces described above may be located in a single user interface. In this regard, it should also be noted that the process steps described herein may be altered to create completely or partially different embodiments of the invention without departing from the spirit and scope of the present invention.

What is claimed is:

1. One or more user interfaces for use in skip tracing, comprising:

a first user interface comprising:
an area for presenting at least one telephone number associated with account information of a customer retrieved from a mainframe computer system,
a documentation area for inputting skip tracing results,
a user interface control for indicating that a telephone number presented in the area is bad, wherein selection of the user interface control causes the documentation area to be populated with data indicating that the telephone number is bad,
a second user interface control for indicating that a second telephone number presented in the area is good, wherein selection of the second user interface control causes the documentation area to be populated with data indicating that the second telephone number is good, and
a third user interface control for causing data populating the documentation area to be recorded in a skip tracing data structure of the mainframe computer system and for causing display of a fourth user interface control, the fourth user interface control for causing the second telephone number to be recorded in a skip queue of the mainframe computer system; and a second user interface comprising:
an area presenting one or more sets of numbers associated with the customer and retrieved from stored information associated with the customer,
a documentation area for presenting skip tracing results input to the documentation area of the first user interface and for inputting skip tracing results associated with the presented one or more sets of numbers,
a user interface control for indicating that a telephone number corresponding to a set of numbers presented in the area is good, wherein selection of the user interface control causes the telephone number to be recorded in the skip queue of the mainframe computer system,
a second user interface control for causing data populating the documentation area to be recorded in the skip tracing data structure of the mainframe computer system,
a third user interface control for indicating that no telephone numbers corresponding to the sets of numbers presented in the area are good, and
a fourth user interface control for causing display of a next user interface.

2. One or more user interfaces according to claim 1, further comprising:
a third user interface comprising:
a user interface control for selecting a mainframe-based directory service,
an area presenting one or more telephone numbers associated with the customer and retrieved from the selected mainframe-based directory service,
a documentation area for presenting skip tracing results input to the documentation area of the first user interface and the documentation area of the second user interface, and for inputting skip tracing results associated with the one or more telephone numbers presented in the area,
a second user interface control for indicating that a telephone number presented in the area is good, wherein selection of the second user interface control causes the telephone number to be recorded in the skip queue of the mainframe computer system,
a third user interface control for causing data populating the documentation area to be recorded in the skip tracing data structure of the mainframe computer system,
a fourth user interface control for indicating that no telephone numbers presented in the area are good, and
a fifth user interface control for causing display of a next user interface.

3. One or more user interfaces according to claim 2, further comprising:
a fourth user interface comprising:
a user interface control for selecting one or more search fields and for causing retrieval, from a plurality of mainframe computer systems, of information in which the one or more search fields are identical to the one or more search fields associated with the one customer,
a second user interface control for causing presentation of the information retrieved from one of the plurality of mainframe computer systems,
a documentation area for presenting skip tracing results input to the documentation area of the first user interface, the documentation area of the second user interface, and the documentation area of the third user interface, and for inputting skip tracing results associated with one or more telephone numbers in the presented information retrieved from one of the plurality of mainframe computer systems,
a third user interface control for indicating that one of the one or more telephone numbers presented is good, wherein selection of the third user interface control causes the one telephone number to be recorded in the skip queue of the mainframe computer system,
a fourth user interface control for causing data populating the documentation area to be recorded in the skip tracing data structure of the mainframe computer system,
a fifth user interface control for indicating that no telephone numbers in the retrieved information are good, and
a sixth user interface control for causing display of a next user interface.

4. One or more user interfaces according to claim 3, further comprising:
a fifth user interface comprising:
a user interface control for selecting a credit reporting service and for causing retrieval of information associated with the customer from a mainframe computer system of the credit reporting service and presentation of the retrieved information,
a documentation area for presenting skip tracing results input to the documentation area of the first user interface, the documentation area of the second user interface, the documentation area of the third user interface, and the documentation area of the fourth user interface, and for inputting skip tracing results associated with one or more telephone numbers in the presented information retrieved from the mainframe computer system of the credit reporting service,
a second user interface control for indicating that one of the one or more telephone numbers is good, wherein selection of the second user interface control causes the one telephone number to be recorded in the skip queue of the mainframe computer system,
a third user interface control for causing data populating the documentation area to be recorded in the skip tracing data structure of the mainframe computer system,
a fourth user interface control for indicating that no telephone numbers in the retrieved information are good, and
a fifth user interface control for indicating that skip tracing is complete; and
a sixth user interface including input fields for documenting possible telephone numbers.

5. A computer-based application for skip tracing, the method steps of the application comprising:
retrieving account information associated with one or more customers from a mainframe computer system;
presenting account information associated with one of the one or more customers, the account information including at least one telephone number associated with the one customer;
presenting a user interface including a user interface control for indicating that a telephone number is bad;
detecting a user selection of the user interface control, the selection indicating that the at least one telephone number is bad;
populating a documentation area of the user interface with the indication that the telephone number is bad;
detecting selection of a second user interface control, the second user interface control for inputting a command to proceed to a next step;
in response to detecting selection of the second user interface control, presenting a second user interface, the second user interface including one or more sets of numbers associated with the one customer and a documentation area populated with the indication that the telephone number is bad;
detecting selection of one of the sets of numbers;
in response to detecting selection of one of the sets of numbers, populating the documentation area of the second user interface with the selected one set of numbers;
detecting user selection of a third user interface control of the second user interface, the third user interface control for indicating that the selected one set of numbers is good;

in response to detecting user selection of the third user interface control, recording a telephone number corresponding to the selected one set of numbers is good in a skip queue of the mainframe computer system;

detecting user selection of a fourth user interface control of the second user interface; and in response to detecting user selection of the fourth user interface control, recording data populating the documentation area of the second user interface in a skip tracing data structure of the mainframe computer system.

6. A computer-based application according to claim 5, the method steps further comprising:

detecting user selection of a third user interface control of the second user interface, the third user interface control for indicating that the selected one set of numbers is bad;

detecting user selection of a fourth user interface control of the second user interface, the fourth user interface control for inputting a command to proceed to a next step;

in response to detecting selection of the fourth user interface control, presenting a third user interface including a user interface control for selecting a mainframe-based directory service;

detecting a user selection of the user interface control of the third user interface; and in response to the user selection of the user interface control of the third user interface, retrieving one or more telephone numbers associated with the one customer from the mainframe-based directory service, and presenting the one or more telephone numbers in the third user interface.

7. A computer-based application according to claim 6, the method steps further comprising:

detecting user selection of one of the one or more telephone numbers presented by the third user interface;

in response to detecting user selection of one of the one or more telephone numbers presented by the third user interface, populating a documentation area of the third user interface with the selected one telephone number;

detecting user selection of a second user interface control of the third user interface for indicating that the selected one telephone number is good;

in response to detecting user selection of the second user interface control of the third user interface, recording the selected one telephone number in a skip queue of the mainframe computer system;

detecting user selection of a third user interface control of the third user interface; and in response to detecting user selection of the third user interface control of the third user interface, recording data populating the documentation area of the third user interface in a skip tracing data structure of the mainframe computer system.

8. A computer-based application according to claim 6, the method steps further comprising:

detecting user selection of a second user interface control of the third user interface for indicating that the selected one telephone number is bad;

detecting user selection of a third user interface control of the third user interface for inputting a command to proceed to a next step;

in response to detecting user selection of the third user interface control of the third user interface, presenting a fourth user interface including a user interface control for selecting one or more search fields;

detecting a user selection of the user interface control of the fourth user interface;

in response to the user selection of the user interface control of the fourth user interface, retrieving from a plurality of mainframe computer systems information in which the one or more search fields are identical to the one or more search fields associated with the one customer;

receiving a selection of a second user interface control of the fourth user interface associated with one of the plurality of mainframe computer systems; and in response to user selection of the second user interface control of the fourth user interface, presenting the information retrieved from the one of the plurality of mainframe computer systems.

9. A computer-based application according to claim 8, the method steps further comprising:

receiving user input of a telephone number from the information retrieved from the one of the plurality of mainframe computer systems into a documentation area of the fourth user interface;

detecting user selection of a third user interface control of the fourth user interface for indicating that the inputted telephone number is good;

in response to detecting user selection of the third user interface control of the fourth user interface, recording the inputted telephone number in a skip queue of the mainframe computer system;

detecting user selection of a fourth user interface control of the fourth user interface; and in response to detecting user selection of the fourth user interface control of the fourth user interface, recording data populating the documentation area of the fourth user interface in a skip tracing data structure of the mainframe computer system.

10. A computer-based application according to claim 8, the method steps further comprising:

detecting user selection of a fifth user interface control of the fourth user interface for indicating that the inputted telephone number is bad;

detecting user selection of a sixth user interface control of the fourth user interface for inputting a command to proceed to a next step;

in response to detecting user selection of the sixth user interface control of the fourth user interface, presenting a fifth user interface including a user interface control for selecting a credit reporting service;

detecting a user selection of the user interface control of the fifth user interface; and in response to the user selection of the user interface control of the fifth user interface, retrieving information associated with the one customer from a mainframe computer system of the credit reporting service and presenting the retrieved information.

11. A computer-based application according to claim 10, the method steps further comprising:

detecting user selection of a second user interface control of the fifth user interface for indicating that a telephone number retrieved from the credit reporting service is good;

in response to detecting user selection of the second user interface control of the fifth user interface, recording the telephone number retrieved from the credit reporting service in a skip queue of the mainframe computer system;

detecting user selection of a third user interface control of the fifth user interface; and in response to detecting user selection of the third user interface control of the fifth user interface, recording data populating a documentation area of the fifth user interface in a skip tracing data structure of the mainframe computer system.

12. A computer-based application according to claim 10, the method steps further comprising:
   detecting user selection of a second user interface control of the fifth user interface for indicating that a telephone number retrieved from the credit reporting service is bad;
   detecting user selection of a third user interface control of the fifth user interface;
   in response to detecting user selection of the third user interface control of the fifth user interface, recording data populating a documentation area of the fifth user interface in a skip tracing data structure of the mainframe computer system, and presenting a fourth user interface control of the fifth user interface for indicating that skip tracing is complete; and
   in response to detecting user selection of the fourth user interface control of the fifth user interface, presenting a sixth user interface including input fields for documenting possible telephone numbers.

13. A computer-based application for skip tracing, the method steps of the application comprising:
   retrieving account information associated with one or more customers from a mainframe computer system;
   presenting account information associated with one of the one or more customers, the account information including at least one telephone number associated with the one customer;
   presenting a user interface including a user interface control for indicating that a telephone number is good;
   detecting a user selection of the user interface control, the selection indicating that the at least one telephone number is good;
   recording an indication that the telephone number is good in a skip tracing data structure of the mainframe computer system;
   recording the telephone number in a skip queue stored by the mainframe computer system;
   receiving a selection of the telephone number;
   populating a documentation area of the user interface with the indication that the telephone number is good in response to detecting the user selection of the user interface control;
   presenting a third user interface control; and
   detecting user selection of the third user interface control,
   wherein the step of recording the telephone number is the skip queue is performed in response to detecting user selection of the third user interface control.

14. A computer-based application according to claim 13, the method steps further comprising:
   presenting a second user interface control; and
   detecting user selection of the second user interface control,
   wherein the step of recording an indication that the telephone number is good is performed in response to detecting user selection of the second user interface control.

* * * * *